United States Patent [19]

Friedman et al.

[11] Patent Number: 4,608,559

[45] Date of Patent: Aug. 26, 1986

[54] LOCAL MODULATED CARRIER DATA NETWORK WITH A COLLISION AVOIDANCE PROTOCOL

[75] Inventors: Michael S. Friedman, Irvine; Kenneth D. Thomas, Santa Ana; Philip T. Chan, Fullerton, all of Calif.

[73] Assignee: Computer Automation, Inc., Irvine, Calif.

[21] Appl. No.: 409,510

[22] Filed: Aug. 19, 1982

[51] Int. Cl.⁴ .............................................. H04Q 9/00
[52] U.S. Cl. ................................... 340/825.5; 370/85
[58] Field of Search ................. 340/825.5; 370/89, 81, 370/94, 85, 92; 371/22

[56] References Cited

U.S. PATENT DOCUMENTS

| | | |
|---|---|---|
| 3,445,822 | 5/1969 | Driscoll . |
| 3,470,324 | 9/1969 | Harmuth . |
| 3,919,641 | 11/1975 | Kurokawa et al. . |
| 3,949,168 | 4/1976 | Taub . |
| 3,988,712 | 10/1976 | Ezell et al. . |
| 4,063,220 | 12/1977 | Metcalfe et al. . |
| 4,086,534 | 4/1978 | Olson . |
| 4,096,355 | 6/1978 | Rothauser . |
| 4,099,024 | 7/1978 | Boggs et al. . |
| 4,156,106 | 5/1979 | Bumgardner . |
| 4,233,589 | 11/1980 | Rawson et al. . |
| 4,234,952 | 11/1980 | Gable et al. ........................ 340/825.5 |
| 4,251,881 | 2/1981 | Ruether et al. ........................ 370/81 |
| 4,253,188 | 2/1981 | Gable . |
| 4,255,742 | 3/1981 | Gable . |
| 4,259,663 | 3/1981 | Gable . |
| 4,271,507 | 6/1981 | Gable . |
| 4,271,523 | 6/1981 | Gable . |
| 4,281,380 | 7/1981 | DeMesa, III . |
| 4,282,512 | 8/1981 | Boggs et al. . |
| 4,284,976 | 8/1981 | Gable . |
| 4,332,027 | 5/1982 | Malcolm . |
| 4,380,052 | 4/1983 | Shima . |
| 4,409,592 | 10/1983 | Hunt ................................. 340/825.5 |
| 4,409,593 | 10/1983 | Bose ................................. 340/825.5 |
| 4,432,088 | 2/1984 | Frankel ............................. 340/825.5 |
| 4,445,214 | 4/1984 | Reynolds . |

Primary Examiner—Donald J. Yusko
Attorney, Agent, or Firm—Knobbe, Martens, Olson & Bear

[57] ABSTRACT

A modem for a single frequency, modulated RF carrier local data network for a distributed data processing system and a method for line acquisition and contention resolution. The protocol established for line acquisition and contention resolution is implemented by a modem controller. The controller causes the receiver section to listen for foreign carriers to determine when the line is busy. When the client device of the modem desires to send a data packet to another unit, the modem controller causes the receiver to listen for a certain pre-burst period and then causes the transmitter to send a burst of RF carrier out on the line and simultaneously causes the receiver to listen to the line for interference beating, i.e. changes in amplitude on the line which indicates another unit is requesting the line. To insure beat patterns, the frequency of the burst carrier is swept over a range during the burst. If a contention is found, a resolution thereof is made utilizing a random delay and retry protocol.

After the burst, the controller causes the receiver to listen to the line for other carriers. If none are found, the controller causes the transmitter to transmit a data packet preceded by a preamble of 100% modulation level RF carrier. During the preamble period, all receivers in the system set their respective automatic gain control levels to a level for comfortable reception. The gain level so established depends upon the strength of the received signal. This amplification level is maintained throughout the entire data packet.

43 Claims, 19 Drawing Figures

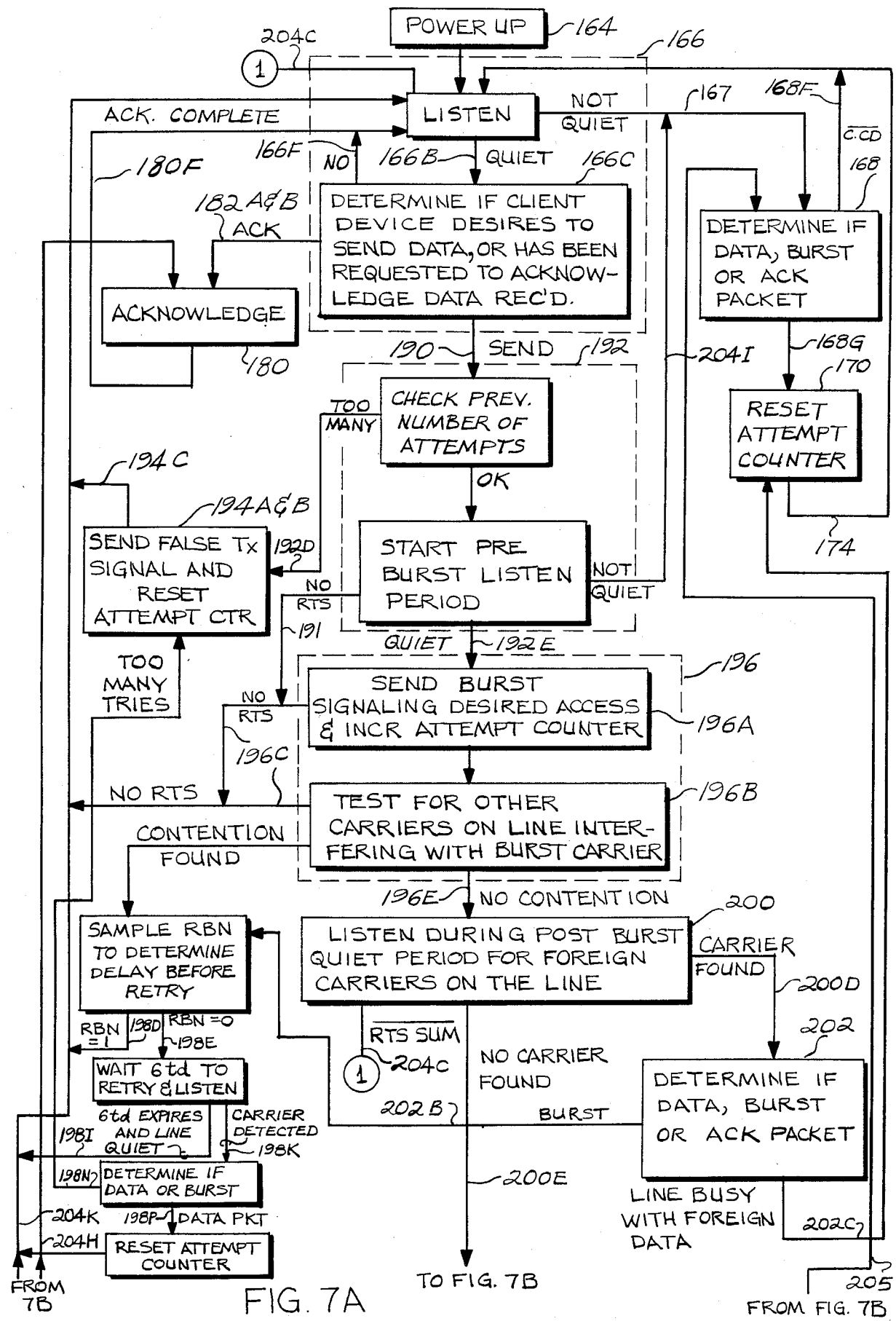

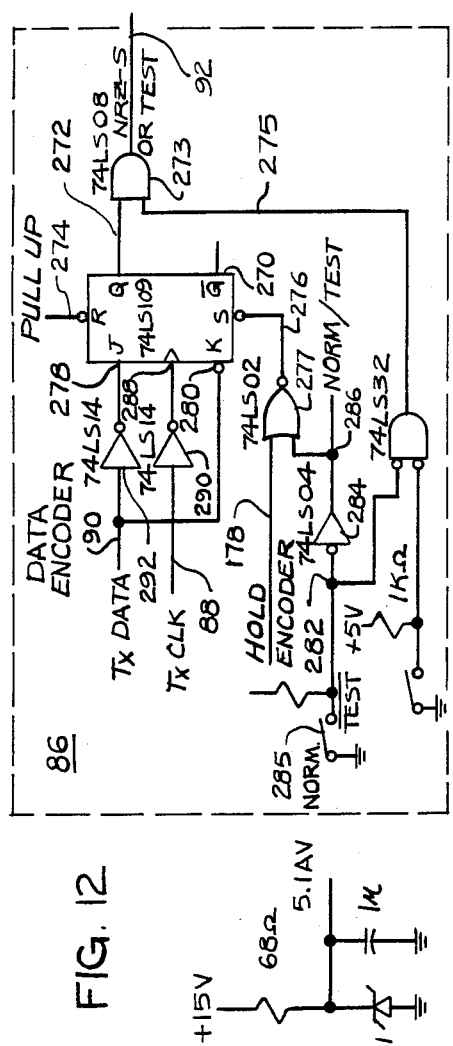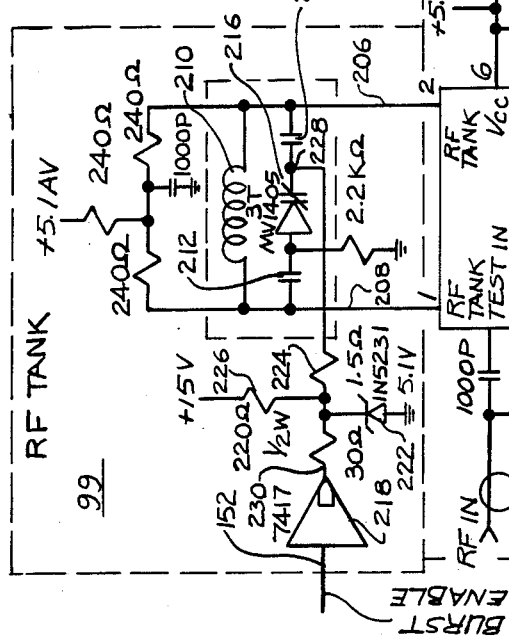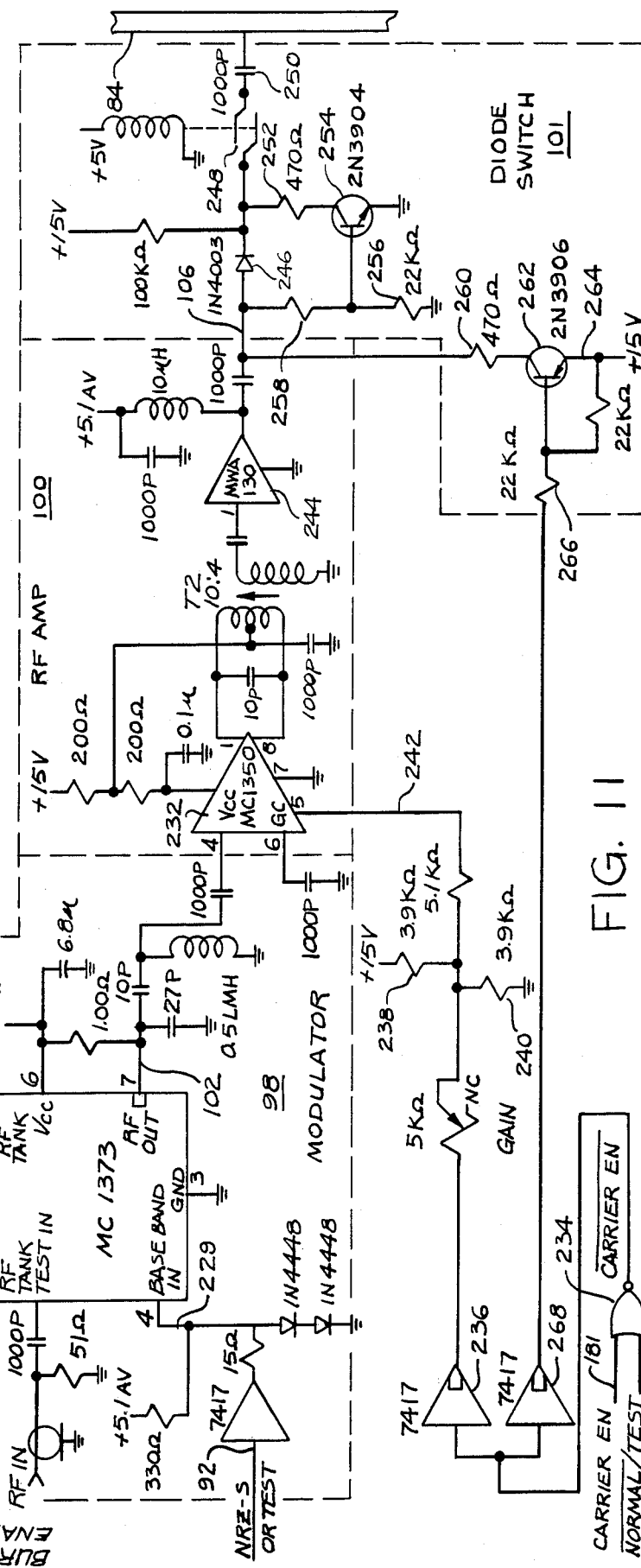
FIG. 12
FIG. 11

LOCAL MODULATED CARRIER DATA NETWORK WITH A COLLISION AVOIDANCE PROTOCOL

BACKGROUND OF THE INVENTION

The invention relates to the field of local data networks, and, more particularly, to the field of contention resolution protocols for local data networks using modulated RF carriers.

As the computer using segment of the population has grown, it has become more important to share expensive assets among multiple users. For example in large companies with large mainframe CPU's, their associated peripherals, and large central data bases, as well as numerous local devices, task processors and terminals used by individual employees and subdivisions of the company, it is advantageous to have the remote users be able to share the assets of the mainframe CPU. Thus it is advantageous to have the remote task processors be able to send and receive data from the main CPU, tap the main data bases and be able to print data and store and retrieve data using the printers and magnetic storage media of the main CPU.

Many companies already have existing coaxial cable networks in place to transmit video for security or cable television channels. To avoid having to install a new set of cables for the computer system it is advantageous to be able to use existing video coaxial cable for the distributed data processing system.

Some systems using modulated RF carriers to transmit data exist in the prior art. However, such systems typically utilize repeaters and head end retransmission apparatus and are more expensive. For example, the head end retransmission apparatus of cable television systems is designed to receive data at one frequency and convert it to data of another frequency for retransmission on the cable. The repeaters in the cable have two separate amplifiers, each connected to the same cable, and with one for each direction. Because the output of one amplifier must be connected to the input of the other, unless each works at a different frequency, the repeaters will oscillate. Where different frequencies are used, a head end retransmission unit is necessary. Different cables for transmission and reception could be used but this too requires head end apparatus and the use of two cables is more expensive. It is advantageous to eliminate the need for repeaters and head end apparatus and to use a system and protocol which makes it possible to transmit and receive on the same frequency because a simpler, less expensive system results.

Broadband systems have a major problem with detection of colliding transmissions. In the prior art, there have been schemes proposed to solve this problem. One such scheme adopted by the I.E.E.E. is the so-called token passing scheme. In these systems a token signal is passed around the system and only the unit which has the token can transmit. However, these schemes can be inefficient where the unit which has the token has nothing to transmit at the time and passes the token along but needs to transmit a data packet soon after the token is passed. In such a case, the unit must wait until the token comes around again before it can transmit.

It is important that contention resolution protocols be adopted to avoid colliding transmissions.

SUMMARY OF THE DISCLOSURE

There is disclosed herein apparatus and a method for transmitting and receiving serial data on a transmission medium utilizing modems which transmit and receive single frequency modulated RF carriers and which incorporate a contention resolution scheme to avoid colliding transmissions. There is no need for repeaters or head end retransmission apparatus in the disclosed system.

The apparatus of the local data network disclosed herein as the preferred embodiment consists of coaxial cable with a plurality of taps on the line, two taps for each modem. However, the concept could easily be used in other embodiments utilizing fiber optic cable or other transmission mediums. To each pair of taps there is connected a transceiver modem with transmit and receive sections which work at the same frequency RF signal. In a fiber optic system, a single color would be used. Each modem can be coupled to additional devices through an optional multiplexer. The transceiver is controlled by a modem controller which causes the receiver to listen for other carriers on the line during the non-transmitting state. When a client device connected to the modem desires to send data, after deciding the line is quiet, the modem controller causes the transmitter to send an access burst of 100% modulated radio frequency carrier and causes the receiver to listen for amplitude changes on the line caused by interference beating between the access burst and any other carrier on the line. To insure beating, the modem controller causes the frequency of the access burst to be swept over a range of frequencies during the burst.

If interference is found, a random delay controlled by a random number generator occurs prior to retry. If no interference is found during the burst, the modem controller causes the receiver to listen for a certain post burst period. If no foreign carrier is detected on the line, the modem controller causes a data packet preceded by a preamble of 100% modulated RF carrier to be sent.

During the preamble of the data packet, the automatic gain control circuits of all modems on the line cause their receiver gain levels to be adjusted depending upon the signal strength at their locations on the line. The automatic gain control level established in each receiver during the preamble is held constant throughout the data packet.

BRIEF DESCRIPTION OF THE DRAWINGS

FIG. 11 is a detailed schematic of the modulator, RF amplifier and diode switch of the transmitter.

FIG. 12 is a detailed logic diagram of the data encoder of the transmitter.

DETAILED DESCRIPTION OF THE PREFERRED EMBODIMENT

Figure 1:
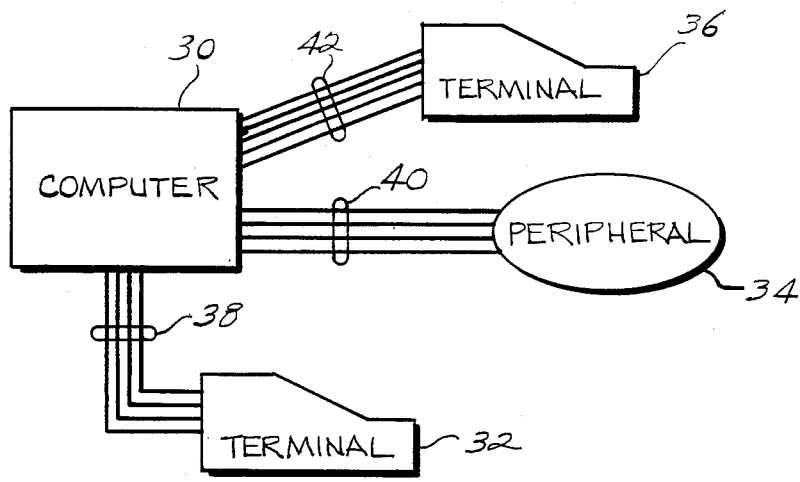
FIG. 1 is a drawing of a typical prior art computer installation using parallel connections.

Referring to FIG. 1 there is shown a typical parallel cable computer installation. The computer or CPU 30 is coupled to its various peripherals 32, 34 and 36 by parallel conductor cables 38, 40 and 42. These cables carry data, address and control signals to and from the units of the system.

The system shown in FIG. 1 is inadequate for distributed processing systems requiring remote installations for terminals, task processors and other peripherals, because multiconductor cable is very expensive and would cause signal attenuation large enough to render the system inoperative since the signals on the cables 38, 40 and 42 are transmitted at TTL levels. The signal transmission characteristics of multiconductor cable are simply not good enough to locate a peripheral two kilometers away from the CPU 30 because the signals sent from one unit to the other would never reach the addressed unit or be unreadable when they arrived. Further, it would be necessary to lay new cable for the system of FIG. 1, where existing coaxial cable may already be in place.

Figure 2:
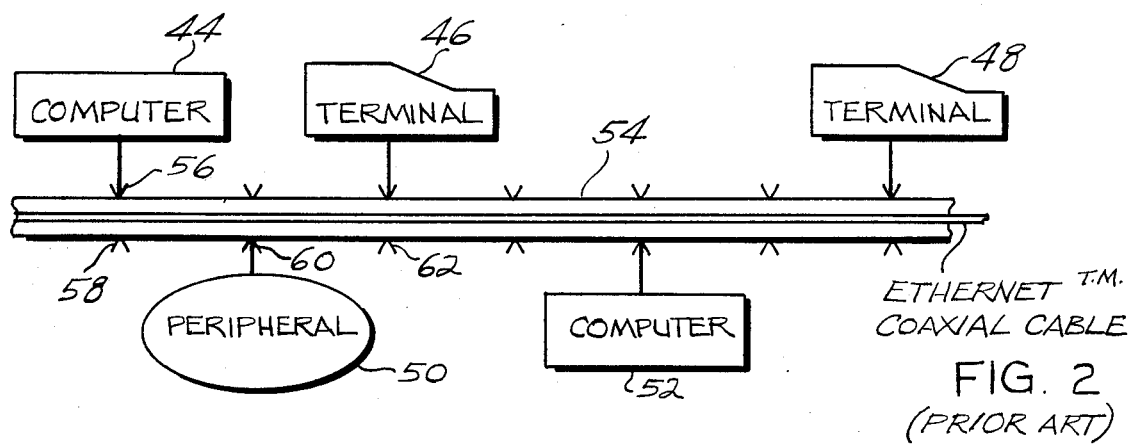
FIG. 2 is a prior art local data network using coaxial cable and baseband data transmission.
Figure 3:
FIG. 3 is a sample pulse train of data pulses as transmitted on the coaxial cable of FIG. 2.

Referring to FIG. 2 there is shown one proposed solution for distributed local data networks which utilize coaxial cable which may or may not already be in place in the user facility. This system sometimes referred to as Ethernet TM. The Ethernet TM system transmits data between the units 44, 46, 48, 50 and 52 of the system on the coaxial cable 54. The units of the system place square wave pulses in serial format on the coax 54 in the manner shown in FIG. 3.

Figure 4:
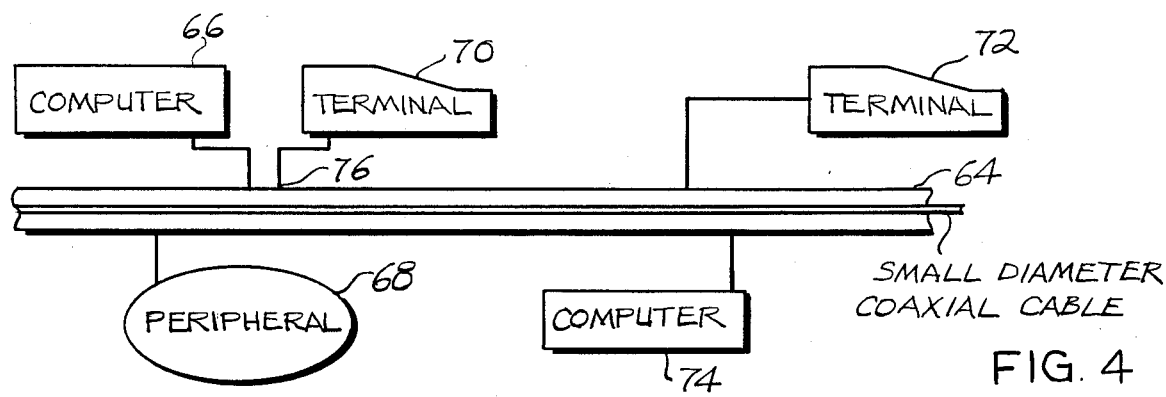
FIG. 4 is a system diagram of the units in a local distributed processing system such as might use the invention described herein.

Referring to FIG. 4 there is shown a drawing of a typical local data network utilizing coaxial line which could utilize the invention described herein. A coaxial cable 64 is coupled throughout a user facility to various units of the distributed data processing system. For example a main CPU 66 and its associated line printer, disk drive or magnetic tape reader 68 can be connected to the coax 64 in the main data processing room. Remote terminals 70 and 72 may be located elsewhere in the building. A local task processor 74 might be located in the test lab or design area to perform local application programs. Each unit on the system can have the benefit of use of the main CPU 66 and its high speed peripherals to process or put data into or take data out of the main data bases.

The system of FIG. 4 typically operates with a carrier frequency of about 50 mhz with a data rate of about 3 mHz.

Figure 5:
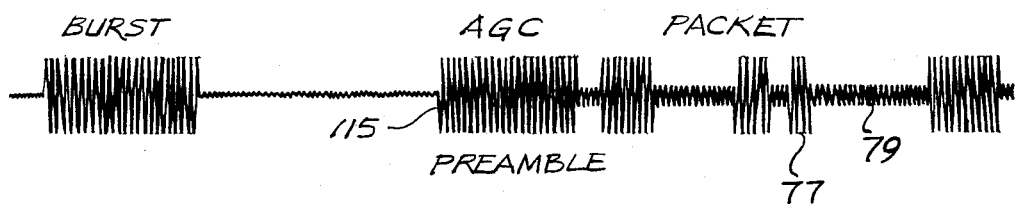
FIG. 5 is a waveform diagram of a modulated RF carrier used to transmit data between the units of the system of FIG. 4.

Data is transmitted between the units of the system of FIG. 4 via an amplitude modulated carrier such as that illustrated in FIG. 5. Frequency modulation or pulse width modulation could also be used. A logic 1 is represented in the preferred embodiment by a section of the carrier modulated at 100% of its amplitude such as at 77 while a logic zero would be represented by a section of carrier modulated at some arbitrary smaller percentage of the 100% value, for example 18% in the preferred embodiment, as illustrated at 77. The data encoding scheme of the preferred embodiment is non-return-to-zero encoding but other coding schemes could be used in other embodiments. This modulated RF carrier scheme is commonly called broadband.

Figure 6:
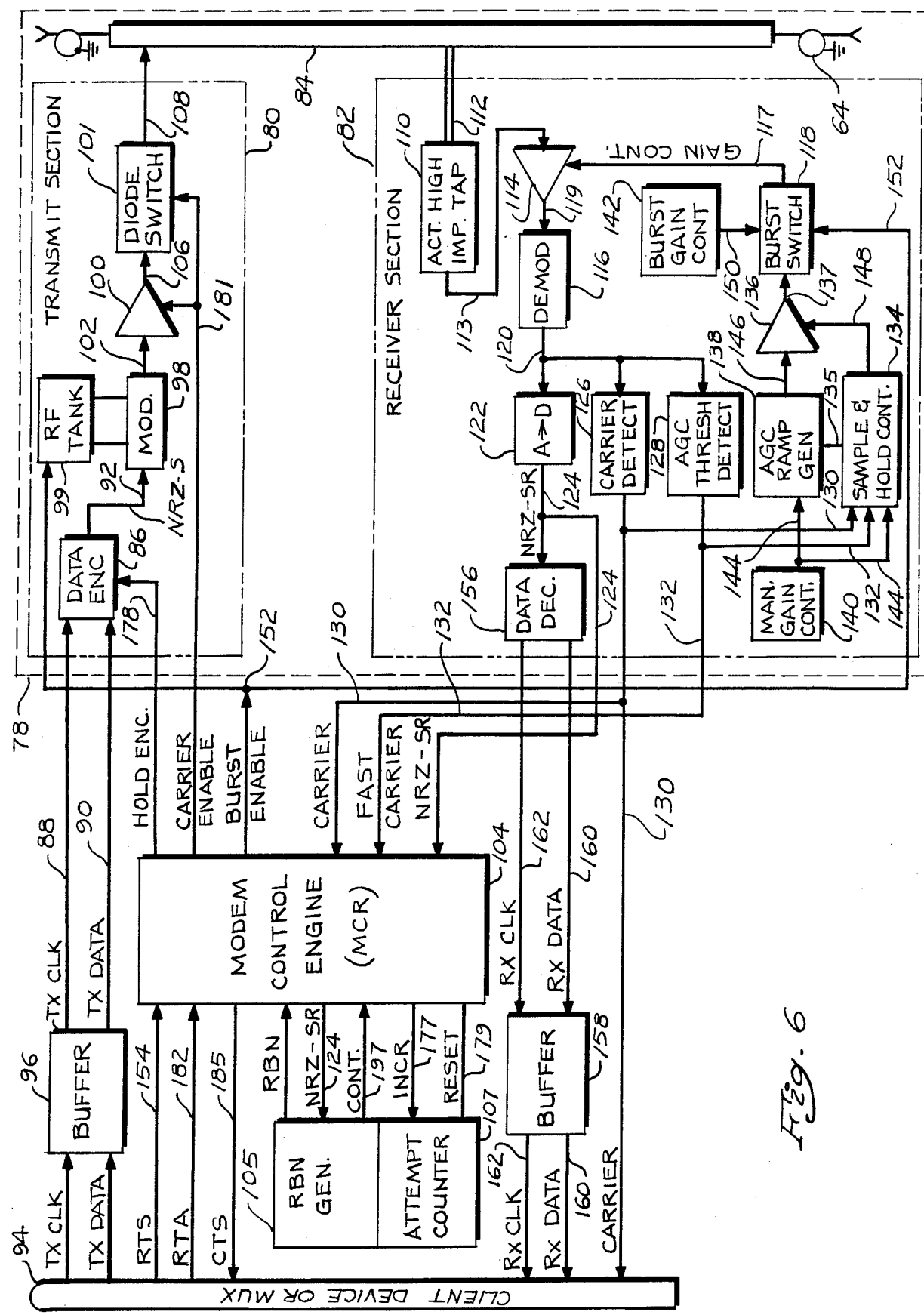
FIG. 6 is a block diagram of the modem of the invention.
Figure 7B:
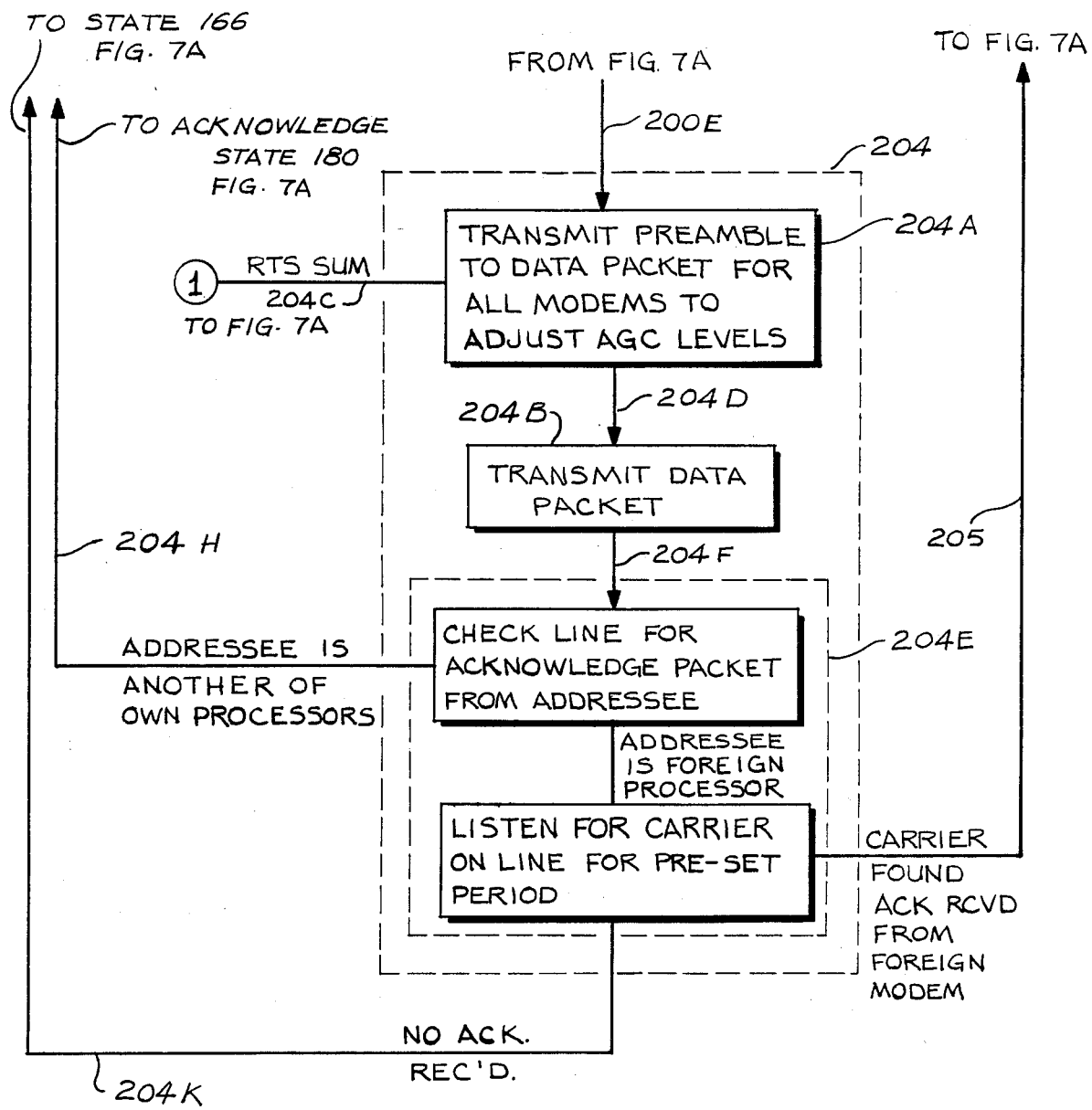
FIGS. 7A and B are a general flow chart of steps in the protocol followed by the modem of FIG. 6.

Each unit in the system of FIG. 4 utilizes a modem of the type described herein. In FIG. 6 there is shown a block diagram of the modem for the local data network invention described herein. FIGS. 7A and 7B are a flow chart of the line acquisition collision avoidance protocol implemented by the modem of FIG. 6. Referring simultaneously to FIG. 6, 7A and 7B, the operation and construction of the modem is as follows.

The modem is comprised of a transceiver 78 including a transmit section 80 and a receive section 82. Both the transmit section and the receive section are coupled to a strip line 84. The strip line 84 is coupled to the coax 64 in FIG. 4 using standard coaxial type connectors and is designed using standard transmission line techniques such that the strip line 84 is effectively an extension of the coax 64 and has a characteristic impedance to substantially match that of the coax to which it is attached.

The transmitter section 80 is comprised of a data encoder 86 which converts a transmit clock Tx CLK signal on a line 88 and a transmit data Tx DATA signal on a line 90 to the non-return-to-zero-space modulation signal NRZ-S on the line 92. The signals on the lines 88 and 90 are transmitted through an optical multiplexer (MUX) 94 of conventional design and a buffer 96 to the data encoder 86 from one of the four client devices (not shown) coupled to the MUX 94. If the multiplexer 94 is not used then block 94 should be interpreted as the client device. Further the signals for requesting to send data, RTS Sum and RTA Sum become RTS and RTA when the multiplexer 94 is not used. The multiplexer 94 serves to sum the individual requests to send or acknowledge from the individual client devices into the composite signals RTA Sum and RTS Sum so that the modem will know when any of its client devices is requesting to send or acknowledge.

The NRZ-S modulation signal on the line 92 is coupled to a modulator 98 and is used to amplitude modulate an RF carrier generated in the modulator 98. The modulated carrier is coupled form the modulator 98 to an RF amplifier 100 via a line 102 where it is amplified. The gain of the RF amplifier 100 is controlled by the Carrier Enable signal on a line 181 from a modem control engine 104. The modem control engine 104 shuts off the RF amplifier 100 when no transmission is desired.

The modulated carrier signal at the output of the RF amplifier 100 is coupled to a diode switch 101 via a line 106. The diode switch 101 is coupled to the strip line 84 via a tap 108 and is also coupled to the Carrier Enable signal on the line 181. The tap 108 is a capacitor soldered to the conductor of the strip line 108. The diode switch 101 is forward-biased by the Carrier Enable signal when the transmitter is transmitting so as to present a low output impedance to the strip line 84 which closely matches the impedance of the transmission medium. When the transmitter is not transmitting, the diode switch 101 is reverse-biased by the absence of the Carrier Enable signal so as to present a high impedance to the strip line 84.

In the receiver 82, the strip line 84 is coupled to an active high impedance tap circuit 110 via an strip line 112. The function of the active high impedance tap 110 and the strip line 112 is to present a high impedance to the strip line 84 at all times with little or no imaginary component so as to minimize insertion loss and not load down the coax 64 when a large number of modems are coupled to the coax line. The modem of FIG. 6 would function without the high impedance tap 110 but not as many modems could be coupled to the coax 64 because of excessive loading. The minimization of the reactive component of the impedance presented to the strip line 84 by the active tap 110 serves to minimize the amount of reflected power from the tap so as to minimize the standing wave pattern caused by disturbances of the line 84.

The output of the high impedance tap 110 is fed on the line 113 to the input of an RF amplifier 114. The RF amplifier has its gain input coupled to a Gain Control signal on a line 117 from a burst switch 118. The Gain Control signal on the line 117 is controlled so that the RF amplifier 114 assumes a certain gain level during some portions of the acquisition protocol and a different gain level during other periods in the acquisition protocol as will be explained in more detail below.

The output of the RF amplifier 114 is applied to a demodulator 116 via a line 119. The demodulator 116 converts the RF signal on the line 119 to an analog signal called RF Envelope on a line 120 which has an amplitude which varies with the amplitude of the envelope of the RF signal on the line 119.

The line 120 is coupled to the input of an analog to digital converter 122. The A/D converter 122 compares the signal on the line 120 to an adjustable reference voltage and generates an NRZ-SR signal on a line 124 which is true or logic 1 when the amplitude of the signal on the line 120 exceeds the reference level.

The signal on the line 120 is also coupled to the input of a carrier detect circuit 126 and to the input of an AGC threshold detect circuit 128. The carrier detect circuit 126 senses the level of the signal on the line 120 and compares it with a fixed reference level to determine if a carrier is present on the strip line 84. The carrier detect circuit generates a Carrier signal on a line 130 which is true when the signal on the line 120 exceeds the predetermined reference level.

The AGC threshold detect circuit 128 compares the RF envelope signal to an adjustable reference voltage and generates a Fast Carrier signal on a line 132. This Fast Carrier signal is coupled to an input of a sample and hold control circuit 134.

The sample and hold control circuit 134 functions with the AGC threshold detector 128, the AGC ramp generator 138, the sample and hold circuit 136, the burst switch 118 and the modem control engine 104 to establish the automatic gain control level for the RF amplifier 114 during receive periods. That is during receive periods, the receiver automatic gain control circuitry must sample a constant amplitude preamble signal, portion 115 in FIG. 5, at the start of each data packet in order to establish an appropriate amplification level, and hold this amplification level constant for receipt of the data packet following the preamble 115.

The manual gain control 140 is coupled to inputs of both the AGC ramp generator and the sample and hold control 134 by a line 144. The output of the AGC ramp generator 138 is coupled to the input of the sample and hold control circuit 136 by a line 146. The sample and hold control circuit 134 has its output coupled to a control input of the sample and hold circuit 136 by a line 148. The sample and hold circuit 136 has its output coupled through the burst switch 118 to the automatic gain control input 117 of the RF amplifier 114. The burst switch 118 is also coupled to a burst gain control 142 by a line 150 and is coupled to the Burst Enable signal from the modem control engine 104 by a line 152.

Generally, the receiver's gain control circuitry has two phases of operation. The first phase is during bursting by the transmitter when access to the line is desired. During this phase, the receiver must listen for interference beating on the line which will result in amplitude changes of the received signal. To detect these changes, the gain of the RF amplifier 114 must be reduced so that the RF amplifier 114 is not swamped by the output from the transmitter 80 and so that the output of the demodulator 116 can be compared to a fixed reference level.

During interference beating, the D.C. signal on the line 120 will be rising above and falling below a fixed reference level. The A/D converter circuit 122 looks for this phenomena during bursting to determine when another carrier is on the line. The A/D converter 122 generates the signal NRZ-S on the line 124 which will contain a pulse each time the changing level on the line 120 exceeds the reference level.

This first phase of gain control operation is accomplished by the modem control engine 104 signalling the burst switch 118 by making a Burst Enable signal on a line 152 true indicating that bursting is occurring. This causes the sample and hold signal on the line 137 from the sample and hold circuit 136 to be disconnected from the gain control input 117 of the RF amplifier 114. Simultaneously, the manually adjustable burst gain control 142 is connected to the line 117 and controls the gain of the RF amplifier 114. The burst gain control 142 can be manually set to establish the gain at any desired level depending upon the predetermined reference level.

The second phase of operation of the receiver gain control circuitry is during the data transmission preamble. The gain of the RF amplifier 114 is initially set at a maximum until a preamble is detected when the transmitter is not bursting as determined by the carrier detect circuit 126 and the burst switch 118. When a preamble occurs, the signal on the line 130 causes the sample and hold control circuit 134 to signal the AGC ramp generator 138 via the line 135 to start generating a ramp signal voltage on the line 146 which is passed through the sample and hold circuit 136 and the burst switch 118 to the RF amplifier 114 and causes the gain to be decreased. As the gain of the RF amplifier 114 is ramped down, the D.C. level of the signal on the line 120 starts to change until it reaches a certain threshold level. When the threshold level is reached, the AGC threshold detector 128 signals the sample and hold control circuit 134 via the line 132 that the proper gain level has been established. The sample and hold control circuit 134 then signals the sample and hold circuit 136 via the line 148 to hold the D.C. level on the line 137 steady at the level then existing. That D.C. level is directly coupled to the RF amplifier 114 gain control input on the line 117 through the burst switch 118 to hold the gain steady throughout the entire data packet.

The incoming data packet is decoded in a data decoder 156 which is coupled to the NRZ-SR signal on the line 124. The data decoder 156 recovers the clock signal from the NRZ data coming in and synchronizes the incoming data with the local modem clock which is part of the data decoder 156. The received data and the recovered clock signals are transmitted through a buffer 158 and to the client device as the Rx DATA and Rx CLK signals on lines 160 and 162 respectively.

The operation of the modem control engine 104 in relation to the client task processors, the receiver and the transmitter in carrying out the transmit protocol will be best understood by referring to FIGS. 7A and 7B in conjunction with FIG. 6.

FIGS. 7A and 7B are a flow chart of the steps carried out by the modem control engine (MCE) 104 in carrying out the transmit line acquisition and contention resolution protocol. Initially, the modem control engine starts at power up state in block 164 of FIG. 7A wherein the system is initialized and then moves to a listen state 166. In that state the MCE 104 listens for foreign carriers on the line 64 by checking the state of the Carrier signal on the line 130. If the line is not quiet, Carrier will be true and the MCE 104 will make a transition on the path 167 to a state 168 wherein the MCE 104 will time the foreign carrier by enabling an internal timer and watching the Carrier signal on the line 130. The purpose of this series of steps is to determine the duration of the foreign carrier to determine if it is a burst, data packet or an acknowledgment packet. This determination is made by determining whether the Carrier signal is on longer than a predetermined time. If it is on longer than a predetermined time, then an attempt counter internal to the MCE 104 is reset to zero attempts after the carrier signal disappears. In FIG. 7A this step is represented by a transition to a state 170 along a path 172.

After resetting the attempt counter, the MCE 104 returns to the listen state 166 along a path 174.

Figure 8A:
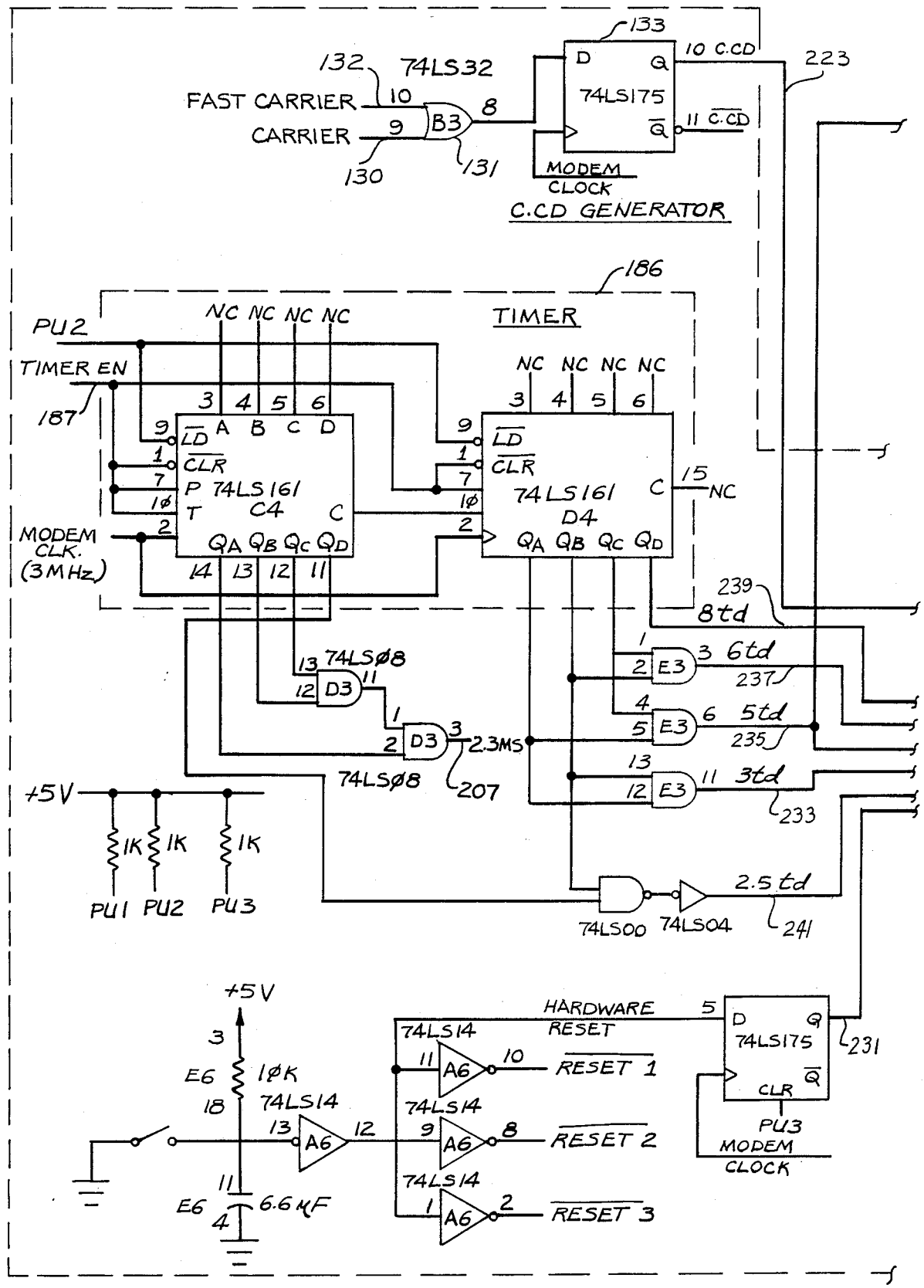
FIGS. 8A and 8B are a detailed logic diagram of the modem control engine.
Figure 8B:
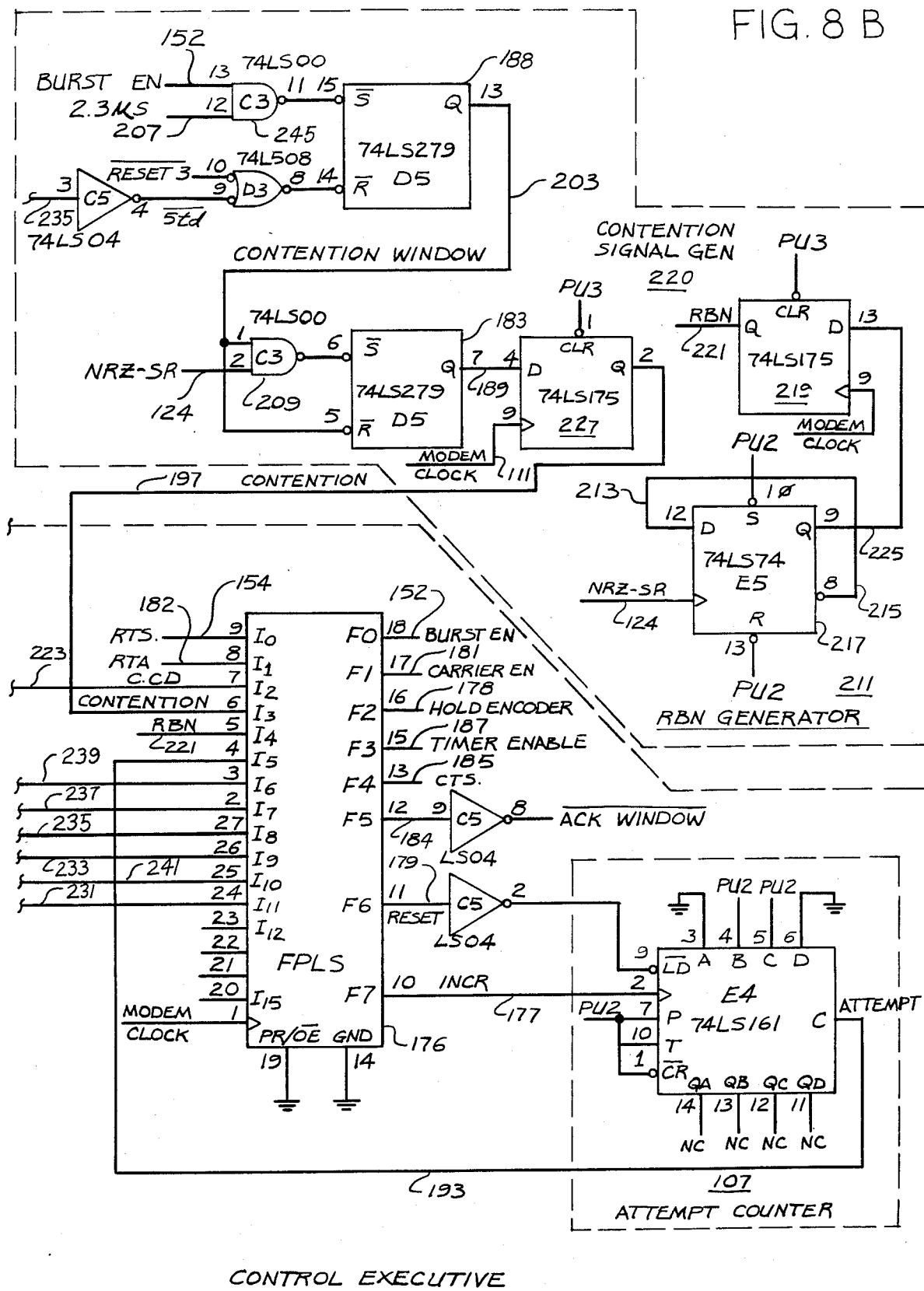
Figure 9:
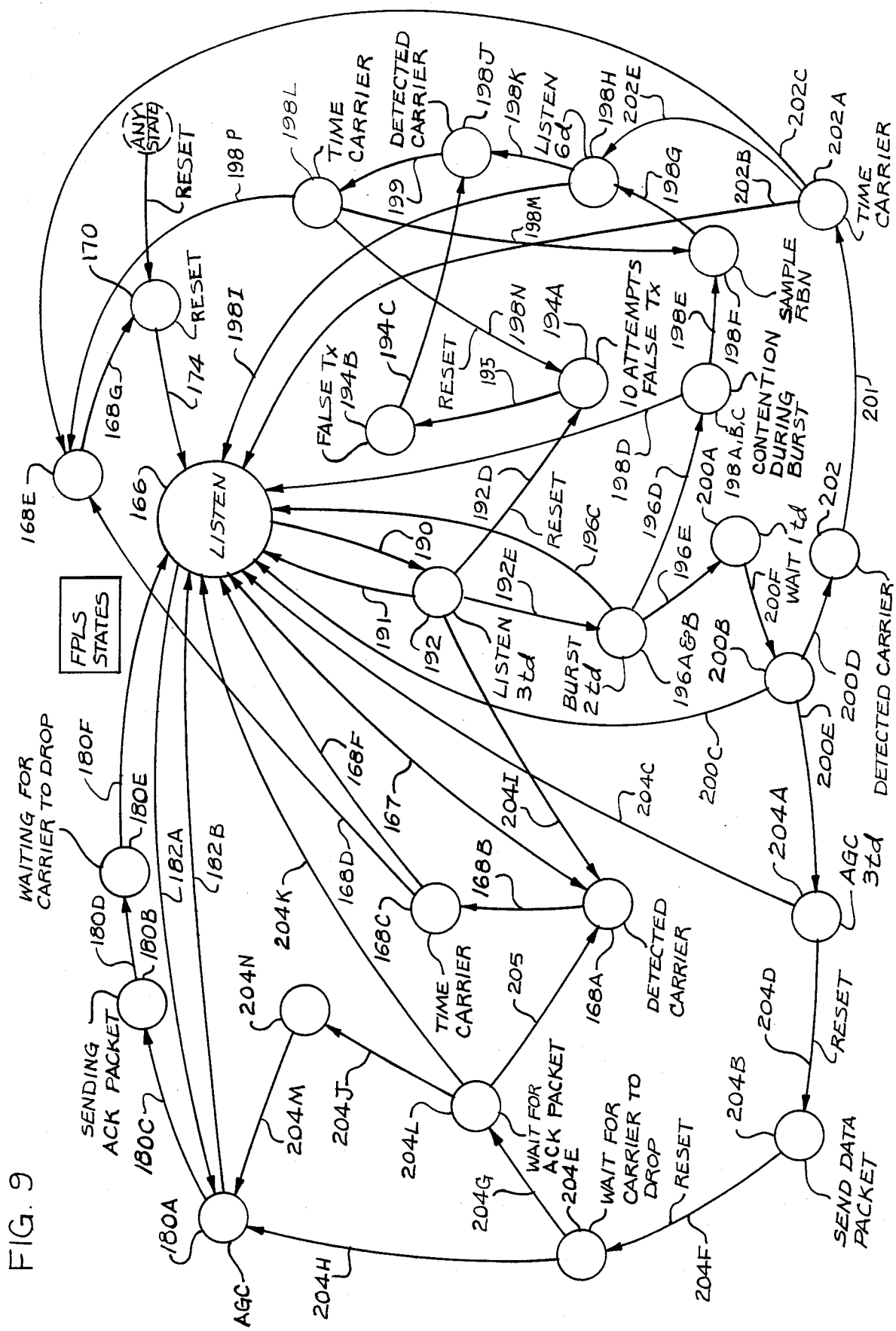
FIG. 9 is a state flow diagram showing the states the modem control engine can assume and the paths between states.
Figure 10A:
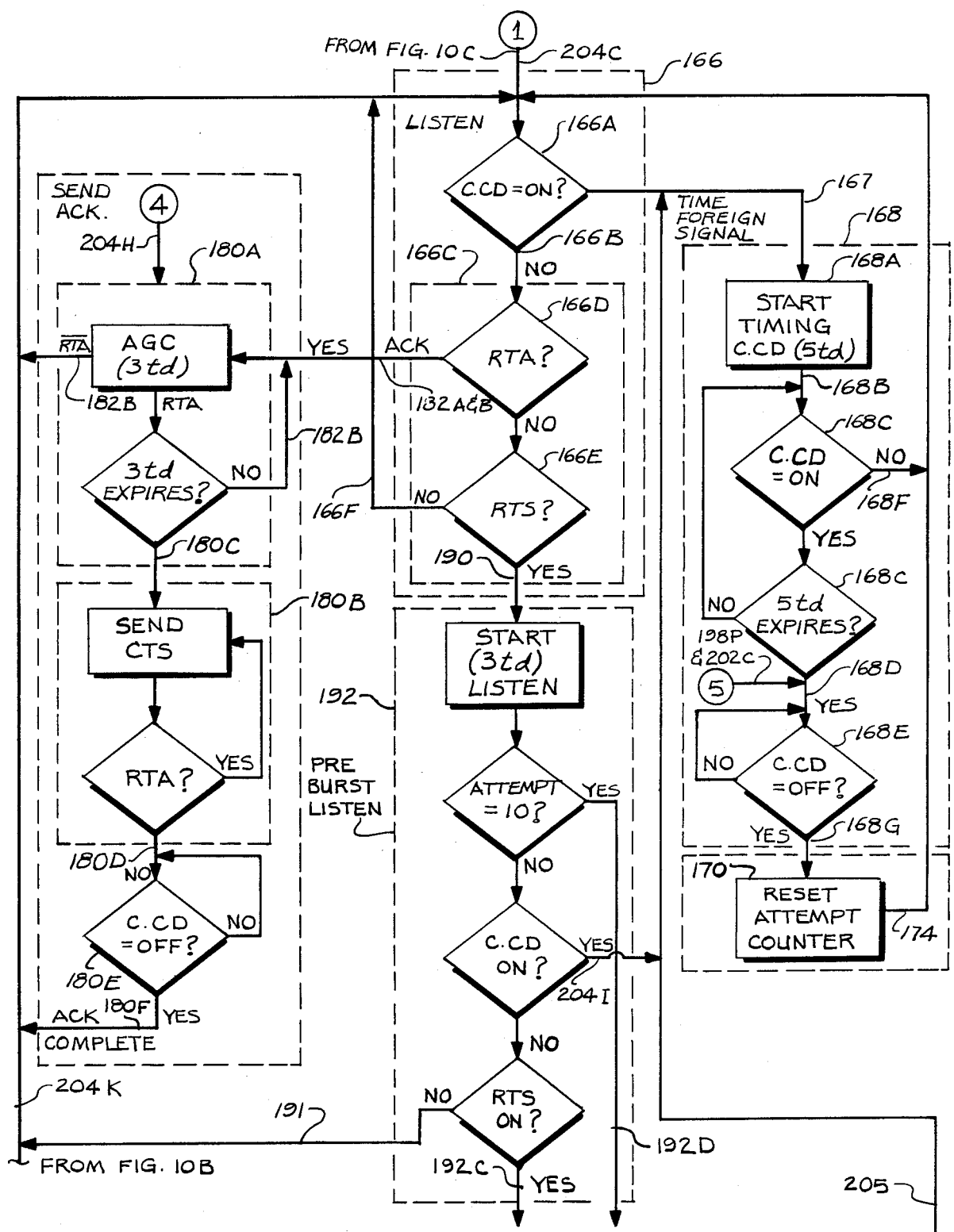
FIGS. 10A–C are a detailed flow chart of the separate steps in the line acquisition and collision avoidance protocol established by the modem control engine.
Figure 10B:
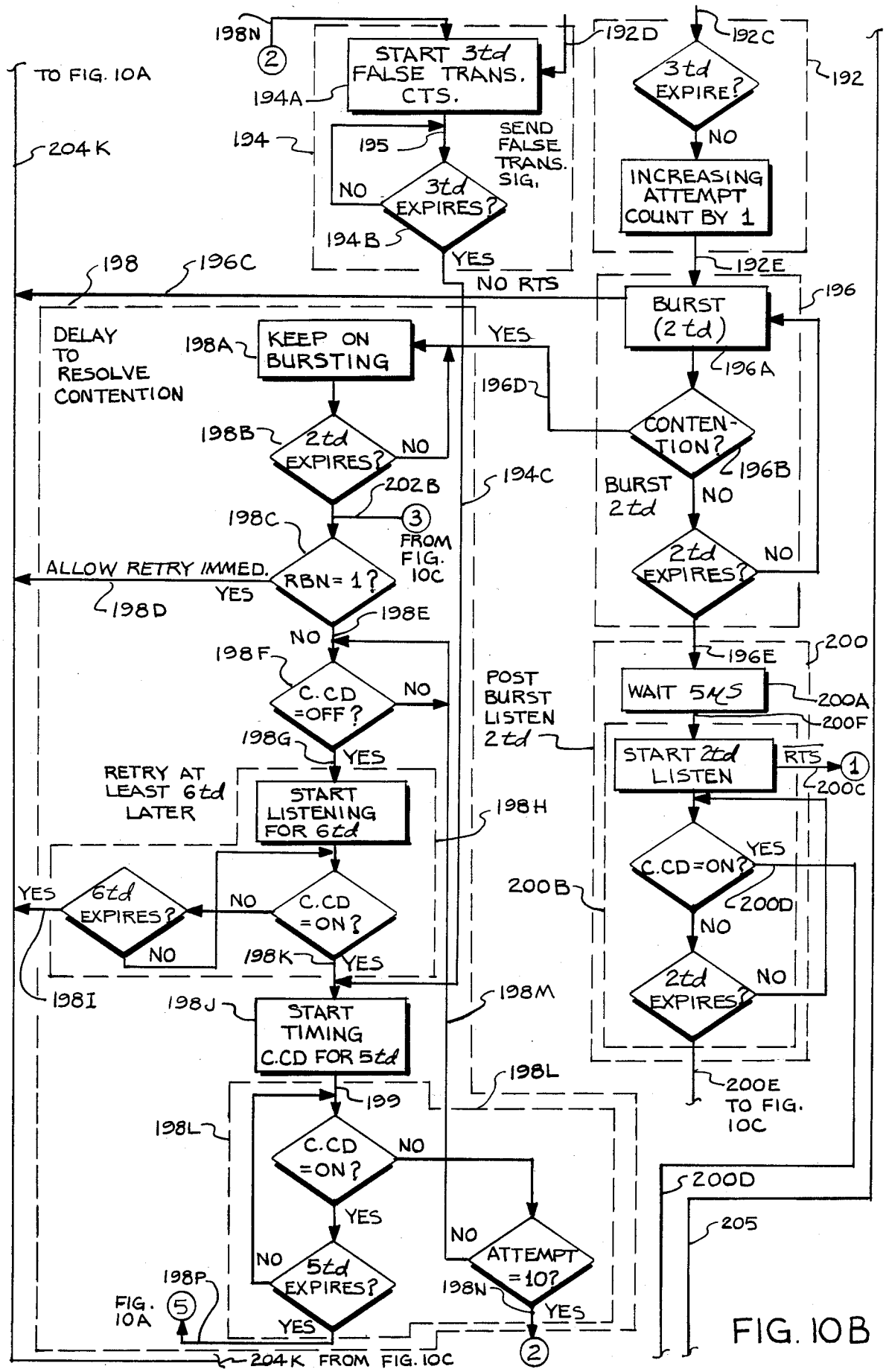
Figure 10C:
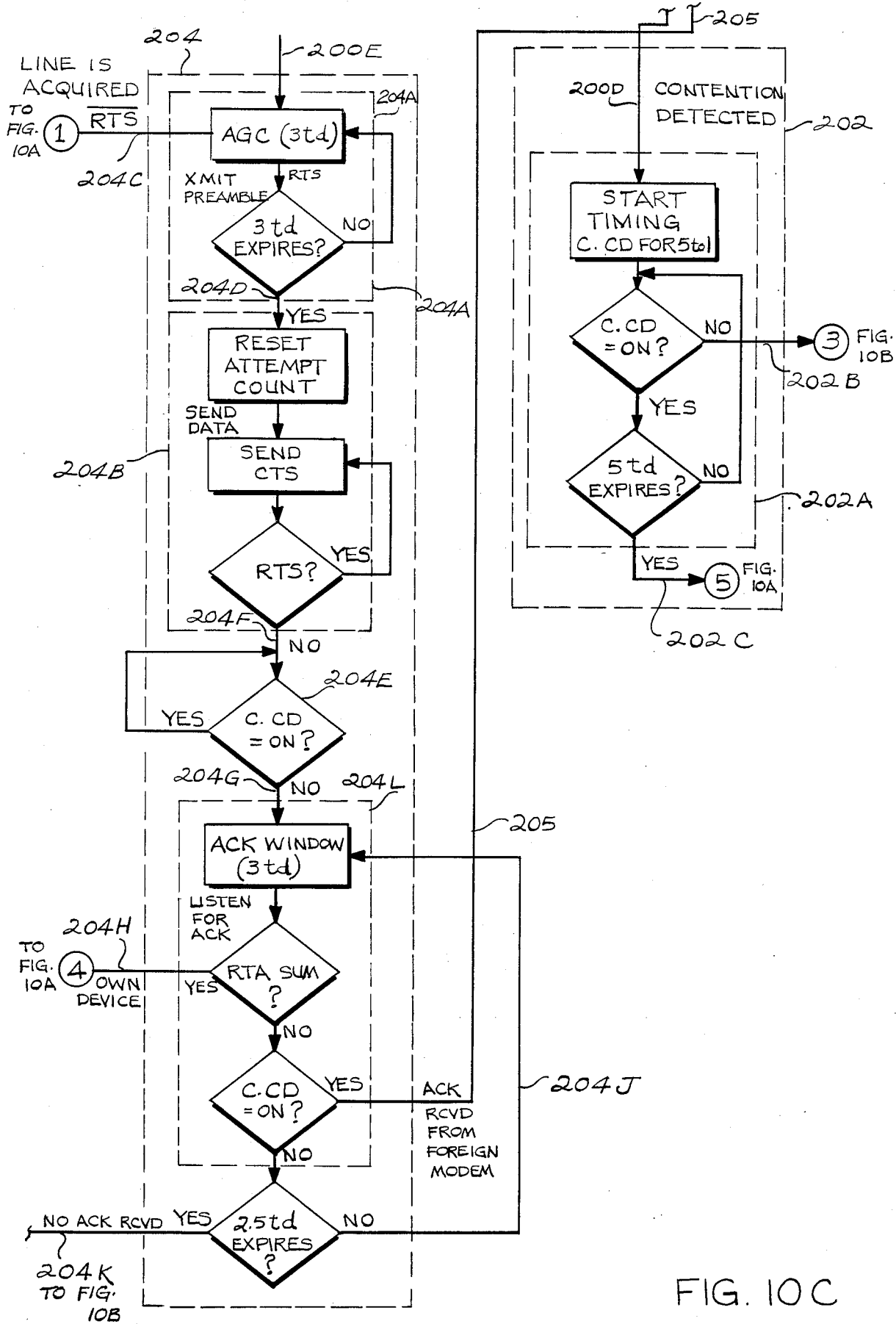

Referring to FIGS. 8A and B, 9, and 10A, B and C the actual implementation of this portion of the transmit protocol can be understood more fully. FIGS. 8A and 8B are a detailed logic diagram of the modem control engine. FIG. 9 is a machine state diagram of the separate states the modem control engine 104 can assume and of the paths between the states. FIGS. 10A-C are a detailed flow diagram of the steps in the transmit protocol implemented by the modem control engine 104.

Referring first to FIGS. 8A and B, the heart of the MCE 104 is shown on FIG. 8B as a fuse programmable logic sequencer (FPLS) 176. This sequencer is, in the preferred embodiment, an 82S105 manufactured by Signetics. The FPLS is coupled to the attempt counter 107 by the signal lines INCR and RESET on lines 177 and 179 respectively which increment the counter and pre-load it to a predetermined constant of 0110 binary respectively.

The FPLS 176 is coupled to the transmitter 80 in FIG. 6 by the Hold Encoder signal on a line 178, a Carrier Enable signal on a line 180 and the Burst Enable signal on a line 152.

The FPLS 176 is coupled to the receiver 82 by the signal Carrier on the line 130 in FIG. 8A, the signal Fast Carrier on the line 132, the Burst Enable signal on the line 152 in FIG. 8B and the signal NRZ-SR on the line 124 in FIG. 8B.

Finally the FPLS is coupled to the client device by signals RTS or, optionally, RTS Sum if a multiplexer is present on a line 154, RTA or, optionally, RTA Sum on a line 182 and CTS or, optionally, CTS Sum on a line 185. That is, if the optional multiplexer is present, the RTS, RTA and CTS signals are RTS Sum, RTA Sum and CTS Sum, respectively.

The FPLS 176 is modified structurally by destroying selected fuses in the internal structure of the chip to implement the Boolean functions illustrated in the table accompanying FIG. 9. The table is included below and should be referred to in conjunction with the discussion of FIG. 9. The transmission and contention resolution protocol represented by FIGS. 7A and B, 10A-C, 9, and 8A and B will be explained structurally and functionally by referring to the above-listed drawings in conjunction with the following explanation.

The steps of the protocol represented by states 166, 168 and 170 in FIGS. 7A-B are detailed in FIGS. 10A-C and FIG. 9. The listen state 166 is represented by the decision block 166A in FIGS. 10A and state 166 in FIG. 9. The signal C.CD is equivalent to either Carrier or Fast Carrier because these two signals are combined by the OR gate 131 in FIG. 8A. In state 166 as soon as the signal C.CD on the line 223 coupled to the I2 input of FPLS 176 in FIG. 8B becomes true, the FPLS changes to a state 168A along a path 167. There is listed below a table for the inputs and outputs from the FPLS 176 for each of the paths in FIG. 9.

| Path | Inputs | Outputs |
|---|---|---|
| 167 | C.CD | Nil |
| 168B | Nil | Timer Enable |
| 168D | 5td & C.CD | Nil |
| 168F | C.CD not | Nil |
| 168G | C.CD not | Reset |
| 174 | Nil | Reset & Incr |
| 182A | RTA & C.CD not | Carrier Enable & Hold Encoder & Timer Enable |
| 182B | RTA not | Nil |
| 180C | RTA & 3td | CTS & Carrier Enable & Ack Window |
| 180D | RTA not | Nil |
| 180F | C.CD not | Nil |
| 190 | C.CD not & RTS & RTA not | Timer Enable |
| 191 | C.CD not & RTS not & Attempt not | Nil |
| 192D | Attempt | CTS & Reset |
| 192E | Attempt not & C.CD not & RTS & 3td | Burst Enable & Carrier Enable & Hold Encoder & Timer Enable & Incr |
| 195 | Nil | CTS & Reset & Incr & Timer Enable |
| 194C | 3td | Nil |
| 196C | RTS not | Nil |
| 196D | RTS & Contention | Timer En & Burst En & Burst En & Carrier En Hold Encoder |
| 196E | 5td & Contention not & RTS | Timer En |
| 198D | 5td & RBN | Nil |
| 198E | RBN not & 5td | Nil |
| 198G | C.CD not | Timer Enable |
| 198I | 6td & C.CD not | Nil |
| 198K | C.CD | Nil |
| 199 | Nil | Timer Enable |
| 198M | Attempt not & C.CD not | Nil |
| 198N | Attempt & C.CD not | Reset |
| 198P | C.CD & 5td | Nil |
| 200F | 6td | Timer En |
| 200C | RTS not | Nil |

-continued

| Path | Inputs | Outputs |
| --- | --- | --- |
| 200D | RTS & C.CD | Nil |
| 201 | Nil | Timer Enable |
| 202B | C.CD not & RBN | Nil |
| 202C | 5td & C.CD | Nil |
| 202E | C.CD not & RBN not | Timer En |
| 200E | C.CD not & 8td & RTS | Carrier Enable & Hold Encoder & Timer Enable |
| 204C | RTS not | Nil |
| 204D | 3td & RTS | CTS & Carrier En & Reset |
| 204F | RTS not | Reset & Incr |
| 204G | C.CD not & RTA not | Timer En & Ack Window |
| 204H | RTA & C.CD not | Timer En & Hold En & Ack Window & Carrier En |
| 205 | C.CD | Nil |
| 204J | 2.5 td not & C.CD not & RTA | Carrier En & Hold En & Ack Window |
| 204M | Nil | Ack Window & Carrier Enable & Timer En & Hold Encoder |
| 204K | 2.5 td & C.CD not | Nil |

The nomenclature C.CD/Nil for the path 167 transition shown in FIG. 9 means that when the I2 input C.CD in FIG. 8B becomes true, the path 167 is taken and there is no output at any of the outputs F0–F7 in FIG. 8B. It is suggested that the reader use 8B, FIG. 9 and the table herein to understand physically which inputs and outputs are in various conditions during various machine states. FIGS. 7A and 7B and FIGS. 10A–C should be used by the reader to understand conceptually the protocol steps which are implemented by the FPLS 176.

As previously noted, the purpose of the state 168 in FIG. 7A is to determine whether the detected carrier which caused the transition on the path 167 was a burst carrier or a data packet. Referring to FIG. 10A, when the FPLS reaches the state 168A, the output signal $F_3$, Timer Enable, on line 187 in FIG. 8A is made true. This initiates a timer 186 in FIG. 8A which is comprised of two 74LS161 standard TTL synchronous counters with direct clear such as are manufactured by Texas Instruments, Inc. and numerous other sources. Both counters are four-bit binary synchronous counters which start to count when the Time Enable signal on the line 187 is true. The various outputs of the counters are coupled together in known fashion to generate five output signals, i.e., $2.5t_d$ on line 241, $3t_d$ on line 233, $5t_d$ on line 235, $6t_d$ on line 237 and $8t_d$ on line 239. Each of these output lines carries a signal which makes a transition from one logic state to another at a predetermined multiple of a fixed time period $t_d$. This unit of time measure $t_d$ is equal to the transmission delay on the line.

The object of the state 168 in FIG. 7A is to determine whether the detected carrier lasts for a period greater than $5t_d$. The FPLS makes its transition from state 166 to 168A along the path 167 in FIG. 9 as soon as the input signal $I_2$, C.CD, becomes true indicating that a carrier has been detected. The Timer Enable signal, $F_3$, is then immediately made true in making the transition on the path 168B to the state 168C.

Referring to FIG. 9 the FPLS stays in state 168C until $5t_d$ has expired and the C.CD signal is still true, at which time it makes a transition on the path 168D to a state 168E. No output is generated on this transition. When C.CD becomes false, the FPLS makes a transition from the state 168E to a state 170 along a path 168G. In making this transition, the Reset signal on the line 179 in FIG. 8B is made true causing the attempt counter 107 to be enabled for a parallel load. When the state 170 is reached, the signal Reset remains true and the signal Incr on the line 177 in FIG. 8B is made true which parallel loads the binary constant 0110 at the A-D inputs into the attempt counter. If C.CD becomes false before $5t_d$ has expired, however, the FPLS moves back to the state 166 along the path 168F which indicates that the foreign carrier lasted less than $5t_d$, is no longer present, and that the line is clear.

To account for the possibility that the packet was addressed to one of its client devices, the FPLS 176 checks for the presence of a request to acknowledge signal RTA or, optionally, RTA Sum at its I1 input. In FIGS. 9 and 10A, this decision is represented by the transition from decision block 166D in state 166 to the block 180A in state 180 along the path 182A. This transition occurs when the FPLS 176 finds its $I_1$, input true and its $I_2$ input false indicating that the line is now quiet and one of its client devices has been requested to acknowledge a data packet.

When the input variables are I1 and I2, not, one of the client devices has been requested to acknowledge a data packet. In that event the transition along the path 182A is made and the output signals Carrier Enable (F1) on the line 181, Hold Encoder (F2) on the line 178 and Timer Enable (F3) on the line 187 in FIG. 8B are made true. These signals enable the transmitter 80 to produce an AGC burst as a preamble for an acknowledgment packet.

Referring to FIG. 6, the Carrier Enable signal on the line 181 drives the RF amplifier 100 in the transmitter to maximum gain and causes a forward bias on the diode switch 101 to put the RF carrier on the strip line 84 and coax 64 via the line 108. The Hold Encoder signal on the line 178 causes the data encoder 86 to put out a string of logic 1's on the line 92 coupled to the modulator 98. This causes the modulator to modulate the RF carrier at the 100% amplitude level. In FIG. 8B, Timer Enable signal starts the timer 186 which times the AGC preamble period.

Referring to FIGS. 9 and 6, if the RTA signal on the line 182 from the client device goes false before the expiration of $3t_d$, the FPLS 176 will return to the state 166 along the path 182B. No output is generated during this transition.

If RTA is still true after $3t_d$ has expired, the FPLS will move to a state 180B along a path 180C. In the state 180B the FPLS will be holding true the CTS signal on the line 185 in FIG. 6 and will also be holding true the signals Carrier Enable on line 181 in FIG. 6 and the signal Ack Window on the line 184 in FIG. 8B. These signals tell the client device to send the acknowledgment packet which it does along the $T_x$ DATA and $T_x$ CLK paths 90 and 88 in FIG. 6. The acknowledgment data goes out on the line in whatever NRZ code has been established for the acknowledgment protocol.

While the acknoledgment packet is going out, the receiver 82 in FIG. 6 is receiving the carrier and the carrier detector 126 in FIG. 6 is holding the carrier signal on the line 130 true while the Fast Carrier signal on the line 132 is also true. These Carrier and Fast Carrier signals cause the C.CD signal to be true by the action of the gate 131 and the flip flop 133 in FIG. 8A. The flip flop 133 serves to synchronize the output of the gate 131 with the modem clock such that the signal C.CD on the line 223 will be set to the true condition on a low to high transition of the modem clock cycle. When the acknowledgment packet is sent, the client device removes the RTA or, optionally, the RTA Sum signal on the line 182 which causes the FPLS to move from the state 180B to the state 180E along the path 180D. The state 180E is a waiting state which waits for the signal C.CD to go false indicating that the line is quiet. When that occurs, the FPLS 176 makes the transition back to the state 166 along the path 180F to continue to listen to the line.

Referring to FIG. 10A, if the original data packet which came in was not addressed to any of the client devices, then the FPLS must determine if any of the client devices are requesting to send data to any other unit in the system. This determination is represented by the block 166E in the state 166. The FPLS looks for the presence of the RTS signal on the line 154 in FIG. 8B from its client device or devices. If none is found, then the FPLS remains in the state 166 as indicated by the path 166F in FIG. 10A.

However, if RTS is true then the FPLS makes a transition from the state 166 to a state 192 via a path 190 as shown in FIG. 7A. The purpose of making this transition is to establish that the line is quiet prior to transmitting an access burst signalling an intention to acquire the line.

As will be apparent to those skilled in the art from the notations for path 190 in the table for FIG. 9, the input conditions required to make the transition from the state 166 to the state 192 are that RTS be true while the C.CD and RTA signals are false indicating that the line is quiet and no request to acknowledgment is present while one of the client devices is requesting to send a data packet. In making this transition, the FPLS 176 raises Timer Enable to true which starts the timer 186 to time the listening period for $3t_d$.

Referring to FIGS. 7A, 9 and 10A & B, in the state 192, the FPLS checks the previous number of attempts. If 10 previous attempts have been made to transmit, the FPLS will transfer to the state 194A along the path 192D in order to send a false transmission message. During this transition, the Reset signal on the line 179 in FIG. 8B is made true resetting the attempt counter and the signal CTS on the line 185 in FIG. 8B is made true indicating the FPLS is signalling a false transmission.

If the previous number of attempts is less than 10, Attempt on line 193 in FIG. 8B is false. In that event, the FPLS checks the C.CD signal at its $I_2$ input to see if any foreign carriers are on the line. If C.CD is false, the FPLS checks to see if RTS on line 154 in FIG. 8B is false. If all three signals are false, the FPLS makes a transition from the state 192 back to the state 166 via the path 191.

If a foreign carrier comes on the line during this preburst listening period with the number of attempts less than 10, the FPL senses that the coax line 64 is not quiet from the C.CD signal and makes the transition to the previously described state 168A along the path 204I. The foreign carrier is timed in the state 168 as previously described and processing proceeds as previously described.

When the transition to the state 194A in FIGS. 7A, 9 and 10B is made, the CTS signal, or optionally, the CTS Sum on the line 185 in FIG. 6 is made true and then false $3t_d$ later by the FPLS indicating to the client device trying to send data that there is some sort of trouble or heavy traffic and the transmission is aborted. This operation is represented by the transition on the path 195 to the state 194B in FIGS. 10B and 9. On this path the attempt counter 107 is pre-loaded with a constant and the timer is enabled. When $3t_d$ expires the FPLS moves to the state 198J on the path 194C.

Referring to FIG. 7A, 9 and 10B if 10 previous attempts have not been made to transmit and the line has been quiet for $3t_d$ and the client device is still requesting to send, the FPLS makes a transition to the burst for $2t_d$ state 196 along the path 192E. This marks the start of the $2t_d$ burst of non data bearing carrier for contention resolution. This transition on the path 192E will not occur unless the RTS signal is still true indicating that the client device still desires to send a data packet, attempt is false and the coax line has been quiet for $3t_d$ as indicated by C.CD false and $3t_d$ true. The FPLS then makes the Burst Enable, Carrier Enable, Hold Encoder, Timer Enable and Incr. signals true on the lines 152, 181, 178, 187 and 177 respectively in FIG. 8B. The Timer Enable signals starts the Timer 186 to time the burst, and the Incr. signal increments the attempt counter 107 to keep account of the number of attempts to acquire the coax line 64 which have been made to transmit the data packet for which the transmission request has been made. If RTS becomes false while in the state 196, the FPLS will make a transition back to the listen state 166 along a path 196C.

Referring to FIG. 6, the Hold Encoder signal causes the data encoder 86 to put a string of NRZ logic 1's on the line 92 to cause the modulator to modulate the RF Carrier at 100% amplitude such that the burst carries no data. The Carrier Enable signal on line 181 enables the RF amplifier 100 in the transmitter 82 and causes the R.F. amplifier 100 to pass the modulated carrier on line 102 through to the diode switch 101 and causes the diode switch 101 to change impedance states from a high impedance to a low impedance which approximately matches the impedance of the strip line 84.

The Burst Enable signal on the line 152 is coupled to an RF tank circuit 99 in the transmitter 80 as well as the burst switch 118 in the receiver. The RF tank 99 is coupled to the modulator 98 so as to control the frequency of the RF carrier generated by the modulator 98 by virtue of the electrical characteristics of the RF tank 99. When the Burst Enable signal is false during nonburst transmissions, the electrical characteristics of the RF tank 99 are stable and the frequency of the RF carrier does not vary. However, during burst, the Burst Enable signal causes the electrical characteristics of the RF tank to be varied. The varying elecrical characteristics of the RF tank cause the frequency of the RF carrier to be swept automatically over a range of frequencies during the burst transmission.

The purpose of altering the frequency of the RF carrier is to insure that the contention will be detected if another modem is simultaneously bursting. That is, two burst carriers will interfere with each other and cause interference beating as is known in the art. The interference beating will cause the amplitude on the carrier on the strip line 84 to change in a random wave motion. The reason this interference beating is desirable is to enable the receiver 82 and modem control engine 104 to more easilly determine whether another modem is simultaneously contending for the coax line 64.

The Burst Enable signal also causes the burst switch 118 in the receiver 82 to disconnect the AGC signal on the line 137 from the AGC input line 117 to the RF amplifier 114. Simultaneously, the burst gain control signal on the line 150 is applied to the gain control input 117 of the RF amplifier 114 to set the gain at a fixed, predetermined, manually adjustable level. This level is established such that the demodulator 116 and A/D converter 122 will detect amplitude changes caused by the beating in the demodulated carrier analog signal on the line 120. If beating is occurring, the A/D converter 122 will generate an NRZ-SR pulse on the line 124 each time the signal on the line 120 rises above a predetermined level.

The next machine state in the transmission protocol is to test the NRZ-SR signal to determine if any other modem is contending for the line. Referring to FIGS. 10B, 7A, and 8B, the FPLS moves to state 196B, wherein the FPLS examines the Contention signal on a line 197 to determine if a contention exist. In FIG. 8B, the Contention signal is generated by a contention signal generator 220.

The contention signal on the line 197 is generated by two conventional TTL 74LS279 latches 188 and 183 and a 74LS175 sync latch 227. The latch 188 serves to delay the opening of the contention window by a predetermined time by not raisng the Q output on the line 203 until 2.3 microseconds after Burst Enable on the line 152 becomes true. This is necessary because for a short period after Burst Enable becomes true, the receiver 82 is not able to detect any contentions. The delay is implemented by applying the Burst Enable signal to the set not input of the latch 188 through a NAND gate 245 which has an input coupled via a line which carries a signal from the timer 186 which does not become true until the 2.3 microseconds after the burst starts as will be apparent upon inspection of FIG. 8A.

The contention signal on the line 197 becomes true when the contention window signal on the line 203 is true and the NRZ-SR signal on the line 124 from the receiver 82 is true and the Modem Clock signal on the line 111 makes a low to high transition. Contention Window and NRZ-SR are applied to the set not input of the latch 183 through a conventional 74LS00 NAND gate 209.

When Contention is true on the line 197, the FPLS 176 knows that the receiver 82 is seeing amplitude changes in the strip line 84 indicating that another modem is contending for the transmission medium.

Referring to FIGS. 9, 7A and 10B, there are three paths out of the state 196 for the FPLS 176. The path 196C is taken if the RTS signal becomes false. When this happens, the FPLS knows the client device no longer desires to send or that RTS was falsely asserted for some reason and returns to the listen state 166.

If a contention is found, the FPLS moves to a contention resolution state 198 via a path 196D. If no contention is found, the FPLS moves to a post burst listen state 200 via a path 196E.

The contention resolution protocol of the state 198 consists of a series of steps to determine the amount of delay before retrying the transmission. The amount of delay is determined by generating a random binary number using the randomness of the beat pattern itself and using the random binary number to control the amount of delay before a retry attempt.

Referrng to FIG. 10B, the first steps in the contention resolution protocol are steps 198A, B and C. Steps 198A and B wait for the burst to finish after $2t_d$. In step 198C, the FPLS checks the state of the random binary number (RBN) generator 211 in FIG. 8B to see if the RBN on the line 221 is true or false. If the RBN is true, the FPLS takes a path 198D back to the listen state 166 to retry the transmission after whatever transitions are made from the state 166 as previously described.

If the RBN is false, the FPLS 176 moves over the path 198E to a state 198F where it waits for the foreign carrier to drop off the line by waiting for the signal C.CD to become false. When C.CD does not become false, the FPLS moves over a path 198G to a listening state 198H which lasts for $6t_d$.

The details of the RBN generator will be apparent to those skilled in the art upon inspection of FIG. 8B. The RBN generator is comprised of a TTL 74LS74 flip flop 217 with its D input 213 coupled to the Q not output 215 and its clock input coupled to the NRZ-SR signal on the line 124. The Q output 225 of the flip flop 217 is coupled to the D input of a sync flip flop 219 which has its clock input coupled to the Modem Clock signal from the timer 186 in FIG. 8A. Whatever is the state on the Q output 225 of the flip flop 217 at the time of a low to high transition of the Modem Clock signal will be transferred to the Q output 221 as the signal RBN. As a result of this structure, the flip flop 217 will toggle each time the NRZ-S signal makes an upward transition. Because the beat pattern on the strip line 84 is random, the toggling action is random and the binary number resulting therefrom will be random.

Returning to FIG. 10B, the FPLS, after determining that the foreign carrier is off the line, starts a 6td listening period on the path 198G such that it stays in the state 198H for 6td. If, during the listening period, no foreign carrier is detected through the C.CD signal on the line 223 in FIGS. 8A and B, the FPLS returns to the listening state 166 via a path 198I after 6td expires.

However, if a foreign carrier is detected during the 6td listening period, then the FPLS makes a transition to a detected carrier state 198J via a path 198K. The FPLS then moves to a state 198L by a path 199 wherein it enables the timer and checks the condition of the C.CD signal during a 5td time period. The FPLS also checks the condition of the attempt counter. If the C.CD signal goes false before the expiration of 5td and the number of previous attempts is less than 10, the FPLS moves to the previously described state 198F via the path 198M. Processing then proceeds as previously described.

If the number of attempts has reached 10, the FPLS enables the attempt counter for parallel load and moves over a path 198N to the previously described state 194A to send a false transmission signal. Processing then proceeds as previously described.

If the C.CD signal remains on during the entire $5t_d$ time period, upon the signal $5t_d$ becoming true, the FPLS moves from the state 198L via a path 198P to the previously described state 168E. When the carrier drops the FPLS moves on the path 168G to the previously described state 170 to load reset the attempt counter and then returns to the listen state 166 via the path 174. Thereafter, processing proceeds as previously described. Thus a random distribution of delay periods is incorporated prior to transmission retry.

Returning to the state 196 in FIGS. 10B and 7A, if no contention was detected during the $2t_d$ burst period, the FPLS 176 moves to a post burst listening period state 200 via the path 196E. The first step in this post-burst listening period protocol is 200A where the FPLS waits for a period of $1t_d$, i.e., 5 microseconds. Upon the expiration of this period, the FPLS moves to a state 200B along the path 200F and the timer 186 is started. While in the state 200B, if the signal RTS becomes false, the FPLS transfers back to the previously described state 166 via a path 200C.

While in the state 200B, if a carrier is detected by the signal C.CD becoming true and RTS is still true, then the FPLS moves to a timer state 202 via a path 200D to determine if the detected carrier is a burst, data packet or acknowledge packet. Immediately upon reaching the state 202, the FPLS makes a transition on the path 201 to a state 202A. The transition on the path 201 causes the Timer Enable signal to be made true.

Referring to FIG. 7A, the purpose of the state 202 is to time the foreign carrier to determine whether it is a burst carrier or a data or acknowledge packet. The protocol of the steps of the state 202 are shown in more detail in FIG. 10C. The first step is to begin timing the foreign carrier. If the signal C.CD becomes false before the expiration of $5t_d$ and RBN is true, the FPLS transfers to the previously described listen state 166 in FIG. 10B via the path 202B. If RBN is false however, the FPLS transfers via the path 202E to the previously descirbed state 198H to listen for 6td. If C.CD is still on at the expiration of 5td, the FPLS transfers on the path 202C to the previously described state 168E. Processing from those points then proceeds as previously described.

Returning to the state 200B in FIGS. 9 and 10B, if no foreign carrier is discovered on the line during the post burst listening period of the state 200 in FIG. 7A, then the FPLS will transfer to a state 204 via a path 200E. The purpose of the state 204 is to transmit the preamble to a data packet for the purpose of allowing the receivers in the system to adjust their gain levels. This transfer occurs when C.CD becomes false, RTS is true and 8td is true.

There are two steps in the transmission sequence. The first step is 204A in FIGS. 7B and 10C and FIG. 9. The purpose of this step is to transmit a preamble to the data consisting of a 100% modulated non data bearing RF carrier which lasts for 3td. If the client device trying to send a data packet renders the signal RTS false, then the FPLS will return to the state 166 via the path 204C.

If the client device is still requesting to send data, the FPLS will move to the state 204B via the path 204D after the preamble. The purpose of the state 204B is to send the data packet. The FPLS, in moving to the state 204B along the path 204D, sends the signal CTS or, optionally, CTS Sum when using an optional MUX. Thereafter, the client device sends the data to be modulated onto the RF carrier to the transmitter 80 in FIG. 6 through the buffer 96 along the $T_x$ DATA line 90 and the $T_x$ CLK line 88. The FPLS in moving to the state 204B makes the signal Carrier Enable true which causes the transmitter 80 to set the gain of the RF amplifier 100 at transmit levels and to cause the diode switch 101 to switch to its low impedance state. Thereafter, the data goes onto the strip line via the line 108 and the attempt counter is enabled for a pre-load.

Upon completion of transmission of the data packet, the FPLS moves to the listen state 204E along the path 204F to wait for the carrier to drop. The transition to the state 204E does not occur until the signal RTS becomes false indicating that the client device has completed sending its data packet. Upon making the transition, the attempt counter is pre-loaded to 0110 binary.

In the state 204E, the FPLS waits for the carrier signal on the strip line 84 to drop as indicated by the signal C.CD becoming false. The signal C.CD is true during the transmission of the data packet because the receiver section 82 has its gain automatically set by its own automatic gain control circuitry during the preamble section of the data packet to the proper level to receive the signal from the transmitter 80.

There are two possibilities for the address of the previously transmitted data. First, the data may have been sent to a client device connected to a foreign modem, or second, the data may have been sent to one of the other client devices coupled to an optional multiplexer connected to the same modem. To determine which is the case, the FPLS examines a signal RTA on a line 182 from the client device to determine if the data was sent to one of its own client devices. If the block 94 is a multiplexer in FIG. 6, the signal on the line 182 is RTA Sum which is a combination of the request to acknowledge signals RTA from each of the client devices attached to the multiplexer. Otherwise the signal on the line 182 is simply the request to acknowledge signal from the client device.

If RTA is true, the FPLS transfers from the state 204E to the previously described state 180A along the path 204H. Processing then continues as previously described in order to send out an acknowledgement packet.

If RTA has not become true by the time the state 204E is reached, the FPLS 176 makes a transition to the state 204L along the path 204G. The path 204G will be taken only if the FPLS inputs C.CD not and RTA not are true when the state 204E is reached. The Timer Enable and Ack Window outputs will be made true when this transition is made to create the acknowledge window.

If the signal C.CD becomes true while the FPLS is in the state 204L, the FPLS transfers from the state 204L to the previously described state 168A via the path 205 to time the foreign carrier to determine what kind of transmission it is.

If, however, the signal C.CD is false with RTA becoming true while in the state 204L, the FPLS determines whether $2.5t_d$ have expired since the acknowledgment window was opened. If $2.5t_d$ has not elapsed, and there is still no foreign carrier on the strip line and RTA is true, the modem's own client device has received the data, and the FPLS transfers control on the path 204J to the state 204N and then, immediately, to the previously described state 180A via the path 204M to send an acknowledgment packet. If RTA remains false, the FPLS continues to wait until either the signal C.CD has become true or the signal C.CD has remained false and $2.5t_d$ has expired.

If both C.CD is false and $2.5t_d$ has expired, the FPLS knows no acknowledgment has been received and transfers back to the previously described state 166 via the path 204K and processing continues as previously described. This completes the description of the line acquisition protocol of the modem depicted in FIG. 6.

The individual details of the functional blocks of the transmitter 80 and the receiver 82 are seen in FIGS. 11, 12, 13, 14 and 15.

FIG. 11 shows the details of the modulator 98, the amplifier 100, the diode switch 101 and the RF tank circuit 99. These elements will be described in terms of their function only since the details of the functions of the individual components and the interconnections thereof with the integrated circuits will be apparent to those skilled in the art.

The heart of the modulator 98 is a Motorola MC1373 TV video modulator. The chip has an internal RF oscillator and RF modulator and depends upon the circuitry connected to lines 208 and 206 to determine the frequency of the carrier generated by the RF oscillator. The modulating signal is the signal NRZ-S on the line 92. This signal or a test modulation signal is supplied through a standard TTL 7417 open collector buffer with its output coupled to the baseband input 229 of the modulator. The RF tank inputs 206 and 208 are coupled to a parallel-tuned circuit comprised of an inductor 210 with a 150 picofarad capacitor 212 coupled to one end and a 150 picofarad capacitor 214 coupled to the inductor 210 at the other end. Between the two capacitors 212 and 214 there is coupled a Motorola MV 1405 varactor diode 216 which completes the parallel-tuned circuit. The anode of the varactor diode is coupled to the capacitor 212 while the cathode of the varactor is coupled to the capacitor 214. The cathode of the varactor diode 216 is also coupled to the Burst Enable signal through a 7417 open collector buffer amplifier 218. The output of the buffer 218 is coupled to a 15 volt supply through a resistor 226 and to the cathode of a 5.1 volt zenor diode 222 which has its anode grounded. When the Burst Enable signal on the line 152 is false, a 15 volt signal will be applied to the cathode of the varactor diode 216, and the diode will be in a reverse biased state because of the 15 volt supply voltage coupled through the resistors 224 and 226 to the node 228. Thus, a certain fixed junction capacitance will exist in the varactor diode 216 when the Burst Enable signal on the line 152 is false. Therefore, when Burst Enable is false, the carrier frequency generated by the RF oscillator and the MC 1373 will be fixed at a reference frequency of around 50 megahertz.

When, however, the Burst Enable signal is true, the buffer 218 will ground the line 230 which will result in the varactor 216 becoming less reverse biased. The biased condition on the varactor 216 changes the junction capacitance thereof which causes the total capacitance in the tuned RF tank circuit 99 to be altered. This insures that the frequency of the carrier during the burst segment of the acquisition protocol will be altered over a range of frequencies to insure that interference beat patterns will occur with any burst signals put out by other similar modems.

The modulated RF output on the line 102 is coupled to the input of the RF amplifier 100 the heart of which is a Motorola MC 1350 integrated IF amplifier 232. The amplifier 232 has its gain control input coupled to the Carrier Enable signal on line 181 through a 74LS02 NOR gate 234 and a 7417 open collector buffer 236. A voltage divider comprised of the resistors 238 and 240 establish a steady state gain control level on the line 242 when the Carrier Enable signal on the line 181 is false. When the Carrier Enable signal is true, the voltage on line 242 is altered by the buffer 236 so as to allow the amplifier 232 to pass the RF carrier signal on line 102 through to the diode switch 101 on the line 106 as will be apparent to those skilled in the art.

A Motorola MWA 130 broadband amplifier is interposed between the output of the RF amplifier 232 and the input on line 106 of the diode switch 101. The purpose of this amplifier is to supply additional fixed gain for the fundamental and all harmonics of the modulated RF signal at the output of the amplifier 232.

The diode switch 101 is comprised of a 1N4003 diode 246 interposed between the line 106 and a reed relay 248 coupled to the strip line 84 through a 1,000 picofarad capacitor 250. The cathode of the diode 246 is connected through a load resistor 252 to the collector of a 2N3904 transistor 254 which has its emitter grounded. The base of the transistor 254 is connected to ground through a resistor 256 and is connected to the anode of the diode 246 through a resistor 258. The anode of the diode 246 is also connected through line 106 and a resistor 260 to the collector of a 2N3906 transistor 262. The emitter of this PNP transistor 262 is coupled to a 15 volt D.C. supply via a line to 264. The base of the transistor 262 is coupled through a resistor 266 to the output of a standard 7417 open collector buffer 268. The input of this buffer 268 is coupled to the output of the NOR gate 234. As will be apparent to those skilled in the art, the foregoing structure of the diode switch 101 will cause the diode 246 to be forward-biased when the Carrier Enable signal on 181 is true. The reed switch 248 will be closed when the modem is powered on. Therefore, when the Carrier Enable signal on the line 181 is true, the low impedance of the forward-biased diode 246 is presented to the strip line 84 and tends to provide a closer match between the output impedance of the transmitter 80 and the characteristic impedance of the strip line 84.

However, when the Carrier Enable signal on the line 181 is false, the diode 246 is reverse-biased and a high impedance is presented to the strip line 84 by the transmitter 80. Thus, the strip line 84 is not loaded down by a low impedance at the transmitter output when the modem is in the receive or listening states.

Referring to FIG. 12 there is shown a detailed logic diagram of the data encoder of the transmitter. The heart of the data encoder 86 is a standard 74LS109 JK positive edge triggered flip flop. The NRZ-S signal on the line 92 is coupled through the output of a 74LS08 and gate 273 with one of its inputs coupled to the Q output of the flip flop 270 by the line 272. The clear input on line 274 is coupled to a constant positive DC voltage equivalent to a logic 1. The preset input 276 is coupled to the output of a 74LS02 NOR gate 277 which has one of its inputs coupled to the Hold Encoder signal on the line 178 and the other to the output of an inverter 284 which has its input coupled to a constant DC voltage source equivalent to a logic 1. A switch 285 is coupled to the input line 282 and to ground to cause a logic 0 condition on the line 282 when the switch is in a test position. The input 282 is in a logic 1 condition when the switch 285 is in the normal operation position.

When the Hold Encoder signal on the line 178 is true, the 74LS02 forces the preset input coupled to the line 276 to a logic 0 state which forces the Q output 272 of the flip flop 270 to a logic 1 condition regardless of the condition at the J and K inputs 278 and 280 respectively and regardless of the condition at the clock input 288. Because the AND gate 273 has its other input coupled to a line 275 which is always in a logic 1 condition during normal operation, the NRZ-S signal on the line 92 is a constant logic 1 when the signal Hold Encoder is true.

When the Hold Encoder signal on the line 178 is false, the NOR gate 277 will hold the preset input 276 of the flip flop 270 in a logic 1 condition because of the logic 1 level signal during normal operation at the node 282 which is converted by the inverter 284 to a logic 0 signal on the line 286 coupled to the other input of the NOR gate 277. Thus, during normal operation, when the Hold Encoder signal on the line 178 is false, both the preset and the clear inputs are in a logic 1 condition and the flip flop 270 is free to change state in response to the conditions at the J and K inputs, 278 and 280 respectively, and the clock input 288. The clock input 288 is coupled through a 74LS14 inverter 290 to the signal $T_x$ CLK on the line 88 from the buffer 96 in FIG. 6. The K input 280 is coupled to the signal $T_x$ DATA on the line 90 while the J input 278 is coupled through a 74LS14 inverter 292 to the line 90.

The foregoing input structure of the flip flop 270 implements a non-return-to-zero-space encoding scheme where a transition during a bit cell indicates a logic zero and no transition indicates a logic 1. That is, when the data bit on the line 90 is a logic 1 at the time of the negative transition of the signal $T_x$ CLK on the line 88, the J input 278 will be in a logic 0 condition and the K input 280 will be in a logic 1 condition. The resultant positive going transition at the clock input 288 will cause the flip flop 270 to remain in whatever state it was in during the last bit cell which indicates that the data bit was a logic 1. However, when the data bit on the line 90 is a logic 0 at the time of the negative transition of the clock signal on the line 88, the flip flop 270 will toggle from its previous state, which indicates a logic zero in the bit stream.

Figure 13:
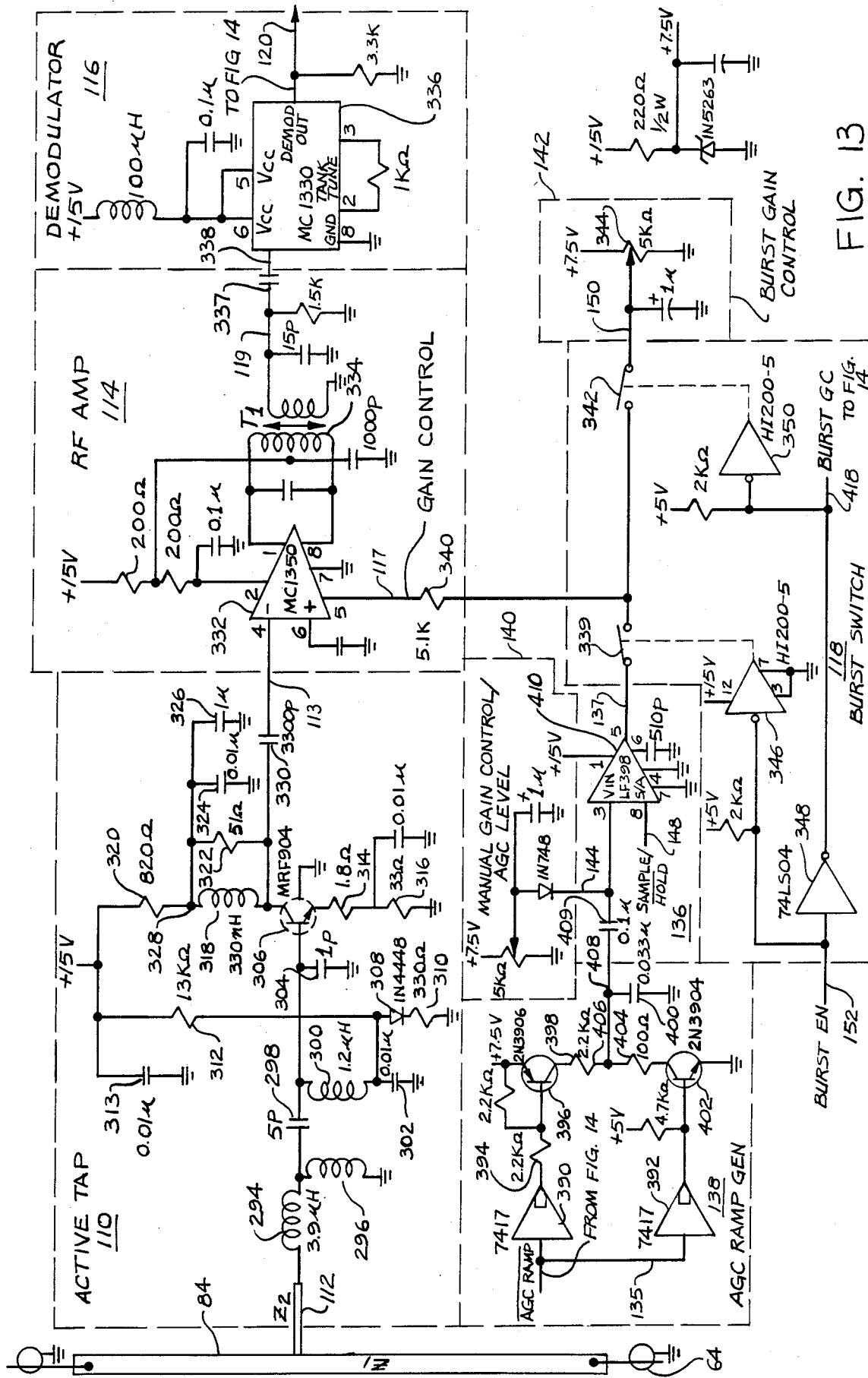
FIG. 13 is a detailed logic diagram of the active tap, RF amplifier, demodulator, AGC ramp generator, manual gain control, sample and hold circuit, burst switch and the burst gain control of the receiver.

Referring to FIG. 13 there is shown in detail a schematic diagram of portions of the receiver. FIG. 13 includes the detailed circuitry of the active tap 110, the RF amplifier 114, the demodulator 116, the AGC ramp generator 138, the burst switch 118, the manual gain control 140, the sample and hold circuit 136 and the burst gain control 142.

The active tap 110 is comprised of a strip line 112 which contacts the strip line 84 coupling the strip line to a high input impedance active gain stage. The purpose of the active tap 110 is to minimize the insertion loss while presenting a high, substantially non-reactive impedance to the strip line 84. The strip line 84 is an extension of the coaxial line 64 and is designed in accordance with microwave RF design principles. The strip line 112 physically touches the strip line 84 and is designed to have a capacitive reactance component of impedance which cancels out the inductive reactance component of the impedance presented by the input network of inductors and capacitors.

The active tap 110 presents an input impedance for the receiver 82 of approximately 4,000 ohms with little or no reactive component such that very little disturbance is created by the active tap 110 on the 75 ohm strip line. It is the reactive component of the input impedance which will cause reflected energy so the active tap has been designed to both present a high impedance and to cancel out the reactive component of that input impedance. Thus, a large number of modems are connected to the coaxial line 64 without loading down the line.

The dimensions of the strip line 112 are critical to establishing the proper reactance cancelling component of the input impedance for the receiver. The strip line 112 has been computer optimized in the preferred embodiment, and it has been found that a strip line 112 which is approximately 0.009 inches wide by 0.684 inches long will have the proper reactive component. The strip line 112 is connected to the base lead of a Motorola MRF 904 high frequency transistor 306 through an impedance matching network comprised of and inductor 294 and a capacitor 298. An inductor 296 couples the node between the inductor 294 and the capacitor 298 to ground. An inductor 300 couples the node between the capacitor 298 and the base of the transistor 306 to ground through a capacitor 302. The anode of a 1N4448 diode 308 is coupled to the node between the capacitor 302 and the inductor 300. The cathode of the diode 308 is connected to ground through a resistor 310. The anode of the diode 308 is also coupled through a resistor 312 to a 15 volt DC supply. A bypass capacitor 313 couples the +15 volt DC supply to ground. The base of the transistor 306 is also coupled to ground through a capacitor 304. The purpose of the inductors 294, 296 and 300 and the capacitors 298, 302 and 304 is to match the output impedance of the strip line 112 to the input impedance of the transistor 306. The input impedance of the transistor 306 is defined by its S parameters in the Motorola R.F. Data Book. Those skilled in the art will appreciate that the impedance looking into the network interposed between the base of the transistor 306 and the output of the strip line 112 toward the base will approximately match the input impedance of the transistor 306 at the frequency of interest and have a certain reactive component. However the impedance looking from the strip line 84 into the strip line 112 toward the base of the transistor 306 should be approximately 4,000 ohms with little or no reactive component.

The emitter of the transistor 306 is coupled to ground through the resistors 314 and 316. These resistors supply negative voltage feedback to the transistor 306 to stablize it. The purpose of the diode 308 is to supply temperature tracking for the transistor 306 to make its operations stable over a range of temperatures.

The collector of the transistor 306 is coupled to the 15 volt supply through an inductor 318 and a resistor 320. A resistor 322 is coupled across the inductor 318, and capacitors 324 and 326 are coupled between the node between the inductor 318 and the resistor 320 and ground. The collector of the transistor 306 is also coupled through a capacitor 330 to the output line 113 of the active tap which is coupled to the input of the RF amplifier 114. The purpose of the output network comprised of the inductor 318, the resistor 322 and the capacitors 324, 326 and 330 is to present an output impedance looking into the active tap from the line 113 of approximately 50 ohms.

The heart to the RF amplifier 114 is a Motorola MC 1350 integrated IF amplifier 332. The output of the amplifier 332 is applied through a transformer 334 and a capacitor 337 to the RF 338 input of the demodulator 116 by the line 119. The function of the various components in the RF amplifier 114 will be apparent to those skilled in the art.

The heart of the demodulator 116 is a Motorola MC 1330 low-level video detector 336. The detector 336 converts the modulated RF carrier at its input 338 to a varying DC voltage signal at its output 120. The signal on the line 120 varies in DC level with the amplitude of the RF carrier at the input 338. The RF Envelope signal on the line 120 is approximately 2 volts for a 100% modulated carrier at 338 and rises to +6 volts for no carrier at the input 338. The function of the other components in the demodulator 116 will be apparent to those skilled in the art.

The operation of the burst switch 118 in FIG. 13 is controlled by the Burst Enable signal on the line 152. The burst switch 118 is comprised of a normally closed relay contact 339 which is coupled to the output of the sample and hold circuit 136 by the line 137 and is coupled to the gain control input line 117 of the RF amplifier 114 through a resistor 340. A separate normally open relay contact 342 is connected between the output 150 of the burst gain control 142 and the gain control input 117 of the RF amplifier 114 through the resistor 340. The burst gain control 142 is a manually adjustable potentiometer 344 coupled between a 7.5 volt DC voltage source and ground.

The burst enable signal on the line 152 is coupled to the input of the relay driver inverting amplifier 346 which controls the relay contacts 339. When Burst Enable is true, the contacts 339 are opened by the relay driver 346. In the preferred embodiment, the relay driver is an HI200-5 manufactured by Harris Semiconductor. The Burst Enable signal is also coupled through an inverter 348 to the input of an inverting relay driver amplifier 350 which controls the contacts 342 and is the same model as the driver 346. When the Burst Enable signal on the line 152 is true, the relay driver amplifier 350 causes the contacts 342 to be closed. Thus when the Burst Enable signal is true, the gain control input 117 of the RF amplifier 114 is coupled through the relay contacts 342 to a manually adjustable DC voltage level established by the setting of the potentiometer 344. The potentiometer 344 is set at a level to prevent the RF amplifier 114 from being swamped by the burst transmission of the transmitter 80 in FIG. 6. The demodulator 116 then converts the received signal by the RF amplifier 114 into the analog demodulated carrier signal on the line 120 which is coupled to the A/D converter 122, the carrier detector 126, and the ACG threshold detector 128 in FIG. 6.

Figure 14:
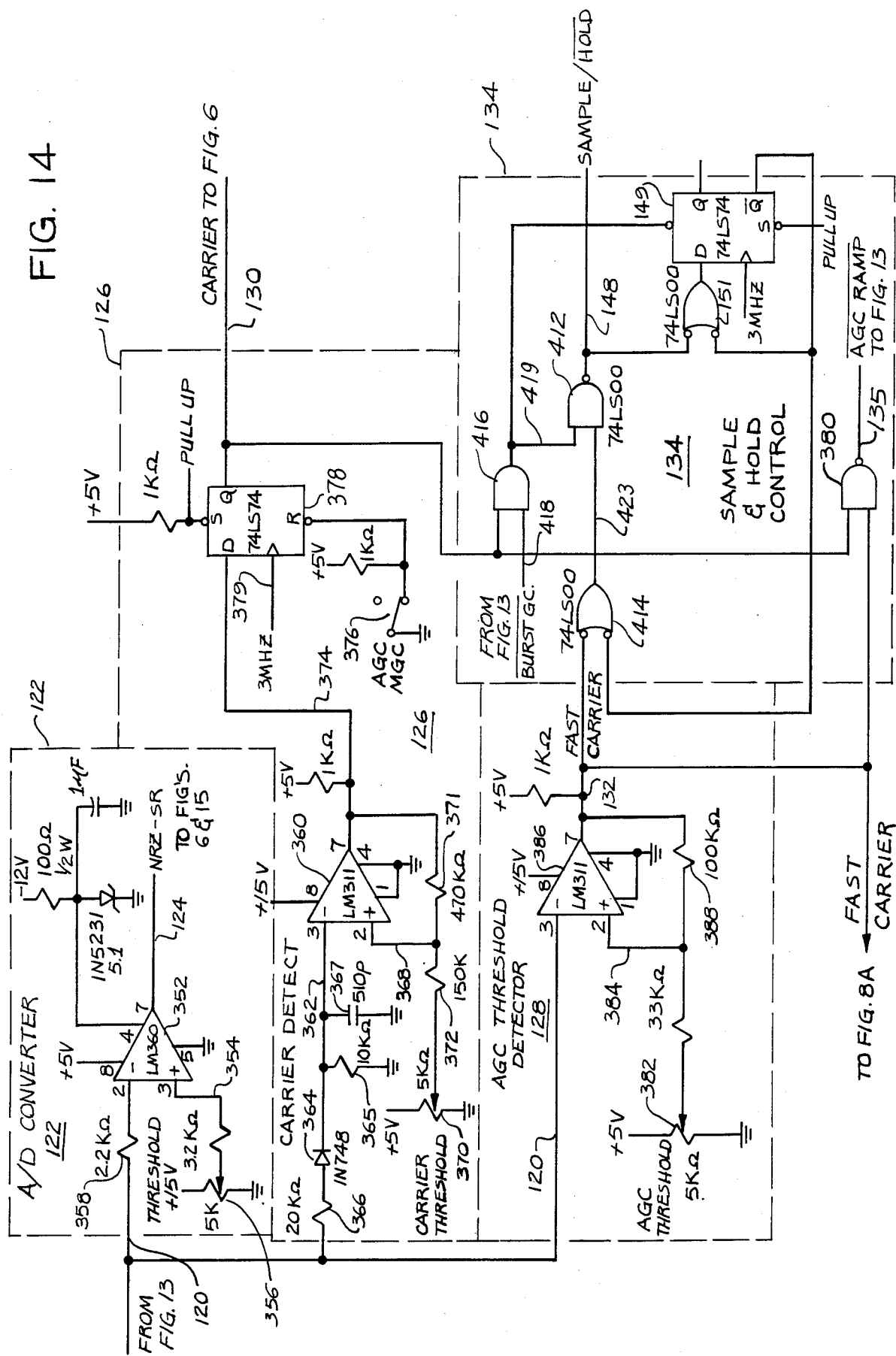
FIG. 14 is a detailed schematic diagram of the A/D converter, carrier detect, threshold detect and sample and hold control circuits of the receiver.

Referring to FIG. 14 there is shown the detailed circuitry of the A/D converter 122, the carrier detector 126 and the AGC threshold detector 128 and the sample and hold control circuit 134.

The A/D converter 122 is used to convert the analog signal on the line 120 to the digital pulses of the signal NRZ-SR on the line 124. As previously noted, the signal NRZ-SR is used by the modem control engine 104 in FIG. 6 to detect when there is a contention on the coax cable during the burst. Further, the signal NRZ-S is used by the data decoder 156, shown in more detail in FIG. 15, to recover the received data and the clock encoded in the data to synchronize the local receiver clock with the transmitter clock.

The A/D converter 122 generates the NRZ-SR signal by using a National Semiconductor LM 360 voltage comparator or equivalent to compare the signal on the line 120 to a reference voltage on a line 354 connected to the non-inverting input. The reference voltage on the line 354 is generated by a manually adjustable potentiometer 356 coupled between a 15 volt DC voltage source and ground. In the preferred embodiment, the reference voltage on the line 354 is set at approximately 3.8 volts. The signal on the line 120 is coupled through a resistor 358 to the inverting input of the comparator 352. During burst, the burst circuitry sets the demodulated carrier signal on the line 120 to a level of 3.6 volts if only the carrier from the transmitter 80 is on the line. When the signal on the line 120 exceeds the threshold reference voltage on the line 354, a positive going transition occurs on the line 124. The signal on the line 120 will vary in amplitude because of beating which is occurring on the strip line 84 because of a contention for the line with another modem which also bursts simultaneously. The NRZ-SR signal will constitute a train of pulses randomly spaced from each other.

The carrier detect circuit 126 also has as its heart a National Semiconductor LM 311 voltage comparator 360. The inverting input 362 of the comparator 360 is coupled to the signal on the line 120 through a diode 364 and a resistor 366 which function in conjunction with a resistor 365 and a capacitor 367 coupled from the line 362 to ground to filter the signal and smooth it out to prevent the output signal from the comparator 360 on the line 374 from pulsing. It is desirable that once a carrier is detected, the carrier signal on the line 130 stay on until the signal on the line 120 rises to 6 volts for a predetermined time.

The non-inverting input 368 is coupled to a carrier threshold manually adjustable potentiometer 370 through a resistor 372. The carrier threshold potentiometer 370 is coupled between a +5 volts DC supply and ground and can be adjusted to establish a reference level at the input 368 over a sufficient range to detect any level of carrier out to the maximum range of the system. The output of the voltage comparator 360 on the line 374 is coupled to the D input of a 74LS74 flip flop 378 by a line 374 and is coupled through a positive feedback resistor 371 to the non-inverting input of the comparator 360. The positive feedback provides a hysteresis in the switching point such that the comparator will switch states when the voltage on the line 120 drops below approximately 0.4 volts but will not switch again until the voltage on the line 120 rises above approximately 1.5 volts.

The flip flop 378 serves as a digital filter with a sampling rate of 3 megahertz because of the connection of the clock input 379 to a 3 megahertz clock input. That is unless the signal at the D input on the line 374 drops to a logic 0 for more than the period of the clock or during a rising clock edge, the carrier signal on the line 130 will remain a logic 1. The flip flop 378 has its preset and clear inputs both held high when the switch 376 is in the automatic gain control position. The switch 376 has a manual gain control position which grounds the clear input of the flip flop 378 such that the signal Carrier on the line 130 is always false.

The Carrier signal on the line 130 is coupled to a NAND gate 380 in the sample and hold control circuit 134 which generates an output signal AGC RAMP not, on the line 135 which is coupled to the AGC ramp generator 138 in FIG. 13. When the switch 376 is in the manual gain control position, the Carrier signal on the line 130 is always false regardless of the amplitude of the signal on the line 120 which causes the AGC RAMP not signal on the line 135 to be false or a logic 1. The effect of this will be discussed in connection with the operation of the AGC RAMP generator 138 in FIG. 13.

The ASG threshold detector 128 in FIG. 14 serves to determine when the signal on the line 120 exceeds a certain AGC threshold level established by a potentiometer 382 at the non-inverting input 384 of a National Semiconductor LM 311 voltage comparator 386 or equivalent. The signal on the line 120 is applied to the inverting input of the comparator 386. The comparator 386 is connected to have positive feedback around the comparator to cause hysteresis and to prevent oscillation. This positive feedback also avoids excessive noise in the output. The positive feedback is provided by a resistor 388 feeding part of the output signal on the line 132 back to the non-inverting input 384. The amount of feedback is selected such that when the signal 120 falls below the 0.6 volt reference level set by the AGC threshold potentiometer 382, the output on the line 132 goes immediately to a logic 1 condition. However, when the signal on the line 120, starting from below the 0.6 reference level begins to rise, it must reach a level of approximately two volts before the output on the line 132 drops to a logic 0.

During non-burst times it is the responsibility of the AGC Ramp generator 138 and the sample and hold circuit 136 in FIG. 13 to work in conjunction with the AGC threshold detector 128 and the sample and hold control circuit 134 in FIG. 14 to adjust the gain of the RF amplifier during the preamble of the incoming data packet to a level for comfortable reception of the entire data packet and then to hold the gain at the established level for the entire data packet. This is accomplished as follows:

When the preamble of the incoming data packet is received, the 100% modulated RF carrier causes the signal on the line 120 to move from the 6 volt condition indicating no carrier to the zero volt condition, indicating full carrier at the RF input 338 of the demodulator 116. As the voltage on the line 120 coupled to the inverting input of the AGC threshold detector comparator 386 passes through the 0.6 volt reference voltage established by the potentiometer 382, the output on the line 132 switches from a logic 0 to a logic 1. Because a carrier is being received, the carrier detector 126 causes the Carrier signal on the line 130 to be true. The NAND gate 380 in the sample and hold control circuit 134 has its inputs coupled to the lines 130 and 132 and therefore sees true signals at its inputs during the preamble period. This causes its output signal AGC RAMP not to be true or a logic 0.

This AGC Ramp not signal on the line 135 is coupled to the inputs of two open collector 7417 buffers 390 and 392 in the AGC ramp generator 138 in FIG. 13. The output of the buffer 390 is coupled through a resistor 394 to the base of a PNP 2N3906 transistor 396. The collector of this transistor is coupled through a resistor 398 and a capacitor 400 to ground. The output of the buffer 392 is coupled to the base of a 2N3904 NPN transistor 402. The collector of the transistor 402 is coupled through a resistor 404 to the ungrounded node of the capacitor 400. Because the signal on the line 135 is a logic 0 during the preamble, the transistor 396 will be turned on and the transistor 402 will be turned off. Since the emitter of the transistor 396 is coupled to a 7.5 volt DC voltage source, a current flow will be established through the transistor 396, the resistor 398, the line 406, the line 408 and the capacitor 400 to ground. Thus the voltage on the line 408 will begin to ramp upward during the preamble. Just before the preamble started, the voltage on the line 408 would be approximately ground by virtue of transistor 402 being turned on by a false AGC Ramp not signal, i.e., a logic 1. This establishes a low resistance path from the line 408 through the resistor 404 and the transistor 402 to the ground connection at the emitter lead of the transistor 402. The line 408 is connected to the input line 144 of the sample and hold circuit 136 through a capacitor 409. The heart of the sample and hold circuit 136 is a National Semiconductor LF 398 sample and hold circuit 410.

The Sample/Hold not terminal of the sample and hold circuit 410 is connected to a line 148 carrying the Sample/Hold not signal from the output of a NAND gate 412 in the sample and hold control circuit 134 on FIG. 14. The NAND gate 412 has one of its inputs coupled to the output of the inverted input OR gate 414 which in turn has one of its inverted inputs coupled to the line 132 from the AGC threshold detector 128. The other input of the NAND gate 412 is coupled to the output of an AND gate 416. This AND gate has one of its inputs coupled to the Carrier signal on the line 130 and the other input coupled to the signal Burst GC not on the line 418 from the output of the inverter 348 in the burst switch 118 on FIG. 13. When the preamble is being received, the transmitter 80 is not bursting and therefore the inputs to the AND gate 416 are both in a logic 1 condition. Therefore the output on the line 419 coupled to an input of the NAND gate 412 is in a logic 1 condition. The other input to the NAND gate 412, i.e., the line 423 is also in a logic 0 condition at this point in time because a full carrier is being received during the preamble which causes the output of the AGC threshold detector comparator 386 to assume a logic 1 condition. Therefore the inverted input OR gate 414 causes the signal on the line 423 to be in a logic 0 condition which causes the NAND gate 412 to cause the signal Sample/Hold not on the line 148 to be in a logic 1 condition. This causes the sample and hold chip 410 in FIG. 13 to act as if a conducting wire were coupled between the input line 144 and the output line 137 coupled through the closed relay contacts 339 to the gain control input 117 of the RF amplifier 332.

Thus as the preamble is just starting to come in, the RF amplifier 114 has its gain set at a maximum value by virtue of the discharged condition of the capacitor 400 which was discharged through the transistor 402 by the action of the signal AGC Ramp not on the line 135. The sample and hold circuit 410 continues to act as a straight-through conductor as the voltage on the capacitor 400 begins to rise. As the voltage on the capacitor 400 rises, the gain of the RF amplifier 332 is decreased which is reflected in a rising DC level of the signal on the line 120. As the signal on the line 120 rises, it eventually reaches a cross-over point of about 2 volts at the inverting input of the AGC threshold detector comparator 386 in FIG. 14. However, when this 2 volt point is reached, the output of the comparator 386 changes to a logic 0 which causes the output of the inverted input OR gate 414 to change to a logic 1. At that time, both inputs to the NAND gate 412 will be in a logic 1 condition which causes the signal Sample/Hold not on the line 148 to become a logic 0. When the line 148 drops to a logic 0 condition, the sample and hold circuit 410 in FIG. 13 holds the voltage level on the line 137 at its then existing level thereby establishing the level of gain of the RF amplifier 114 at a fixed level which lasts for approximately 4 or 5 milliseconds. This period is long enough to receive the entire incoming data packet.

At the same time that the signal Sample/Hold not changed to a logic 0, the signal AGC RAMP not on the line 135 also changed condition causing the transistor 402 to once again turn on and discharge the capacitor 400 making it ready for the next carrier search.

A latch 149 has its D input coupled to the output of an inverted input Or gate 151. One input to the gate 151 is coupled to the output of the NAND gate 412 and the other input is coupled to the Q not output of the 74L574 latch 149. This Q not output is also coupled to the other input of the inverted input Or gate 414.

The purpose of the latch 149 is to latch the line 148 for noise immunity to noise on the line 132 during a packet. As long as a carrier is present, the Sample/Hold not signal on the line 148 will remain in hold mode after hold has been established.

Figure 15:
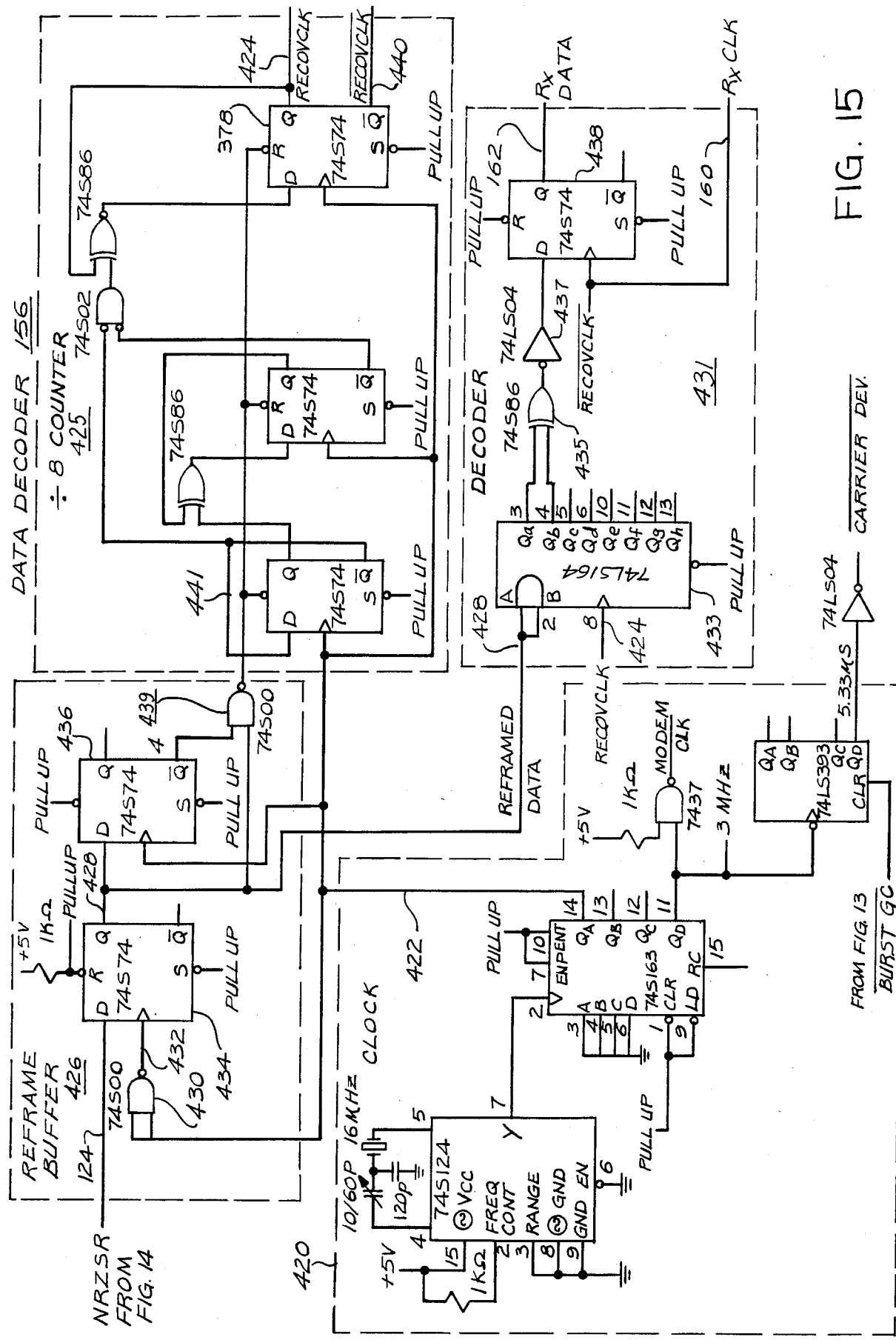
FIG. 15 is a detailed logic diagram of the data decoder in the receiver.

Referring to FIG. 15 there is shown a detailed logic diagram of the data decoder 156 in FIG. 6. The decoder is comprised of a local receiver clock 420 which puts out a pulse train at 24 megahertz on the output line 422. This local clock signal on line 422 is applied to the clock input of a divided by eight counter 425 which divides the 24 megahertz clock signal down to the 3 megahertz data rate of the system. The output of the counter 425 is the signal RECOVCLK on the line 424. A reframe buffer 426 has a data input coupled to the signal NRZ-SR from the A/D converter 122 to FIG. 14.

The local clock signal on the line 422 is coupled through an inverter 430 to the clock input 432 of the reframe buffer 426. The NRZ-SR signal on the line 124 represents the incoming data from the coax 64. The clock transitions on the clock input 432 to the first flip flop 434 of the reframe buffer 426 serve to reframe the incoming data with the local clock as will be apparent to those skilled in the art.

The reframed data appears to the Q output of the flip flop 434, line 428, which is coupled to the D input of a second flip flop 436 in the reframe buffer 426. The purpose of the second flip flop 436 is to reset all the flip flops in the divided by eight counter 425 whenever there is a low to high transition of the reframed incoming data signal on the line 428.

Because the phase of the signal RECOVCLK on 424 compared to the phase of the clock which was used to encode the signal NRZ-SR on the line 124 is not known, there must be some structure which yanks the divide by eight counter output signal RECOVCLK signal back to the middle of the bit cells every time the phase starts to drift off from the transmit clock phase. The structure which accomplishes this function is the flip flop 436 and the NAND gate 439. The flip flop 436 has its clock input coupled to the local clock output 422. The Q not output of the flip flop 436 is coupled to one input of the NAND gate 439 which has its other input coupled to the reframed data signal on the line 428. The output of the NAND gate 439 is coupled to the rest inputs of all three flip flops of the divide by eight counter 425. As will be appreciated by those skilled in the art, the output 441 of the NAND gate 439 makes a high to low transition every time the reframed data on the line 428 makes a low to high transition. This causes the RECOVCLK signal on the line 424 to make its transitions approximately in the middle of each data bit cell of the incoming data signal on the line 124 to synchronize the RECOVCLK signal on the line 424 with the transmitter clock of the sending modem. To avoid loss of synchronization during a long string of one's, the transmitting client's data link controller causes zero bit insertion. That is, a zero is inserted by the transmitter after any succession of five contiguous logic 1's within a frame.

The RECOVCLK signal on the line 424 is applied to the clock input of a decoder 431. The decoder 431 is comprised of a 74LS164 shift register chip 433 having its data input coupled to the Reframed Data signal on the line 428. The $Q_a$ and $Q_b$ outputs of the shift register 433 of the decoder 431 are applied through a 74S86 exclusive OR gate 435 and an inverter 437 to the D input of a 74S74 flip flop 438. The flip flop 438 has its clock input coupled to the signal RECOVCLK not on the line 440. The Q output of the flip flop 438 is the signal $R_x$ DATA on the line 162 coupled to the MUX 94. The $R_x$ CLK signal on the line 160 in FIG. 6 is the same as the signal RECOVCLK not on the line 440. The detailed description of the operation of the decoder 431 will be appreciated by those skilled in the art.

It will be apparent to those skilled in the art that numerous modifications can be made to the invention described without departing from the true spirit and scope of the invention as defined by the claims appended hereto. All such modifications are intended to be included within the scope of the following claims.

What is claimed is:

1. An apparatus for detecting contentions for the transmission medium in a modulated carrier local data network having a plurality of transmitter and receiver modems, each modem comprising:

means for transmitting a non data bearing burst of energy, said burst being a sinusoidal radio frequency carrier having a fixed amplitude;

means for receiving signals on said transmission medium, said receiving means comprising:

a variable gain receiver coupled to said transmission medium to receive carrier energy and amplify it in accordance with said variable gain;

a demodulator for converting the received signal into a D.C. signal which has an amplitude which varies with the amplitude of the output from said variable gain receiver;

a comparator means for comparing the output signal of said demodulator to a reference signal during said burst and for generating a contention signal when said D.C. signal achieves a predetermined relationship to said reference signal; and a means for setting the gain of said variable gain receiver to a predetermined level during bursting such that the comparator means will not generate said contention signal unless interference beating with another carrier is causing the amplitude of the received signal to vary; and means for preventing data transmission in response to detection by said receiving means of energy from any other modem while said burst is being transmitted.

2. An apparatus for detecting contentions for the transmission medium in a modulated carrier local data network having a plurality of transmitter and receiver modems, each modem comprising:

means for transmitting a non data bearing burst of energy;

means for varying the frequency of said burst;

means for receiving signals on said transmission medium; and means for preventing data transmission in response to detection by said receiving means of energy from any other modem.

3. An apparatus for detecting contentions for the transmission medium in a modulated carrier local data network having a plurality of transmitter and receiver modems comprising:

means for transmitting a non data bearing burst of waveform with a frequency that varies during the burst;

means for receiving signals on said transmission medium and detecting amplitude changes on said transmission media caused by interference beating between the signals from two or more transmitters contending for the transmission media; and means for detecting the presence of any signal on said transmission medium during a predetermined post burst listening period.

4. An apparatus as defined in claim 2 or 3 wherein said non data bearing burst is a sinusoidal radio frequency carrier having a fixed amplitude.

5. An apparatus as defined in claim 4 wherein said receiving means includes:

a variable gain receiver coupled to said transmission medium to receive carrier energy and amplify it in accordance with said variable gain;

a demodulator for converting the received signal into a D.C. signal which has an amplitude which varies with the amplitude of the output from said variable gain receiver;

a comparator means for comparing the output signal of said demodulator to a reference signal during said burst and for generating a contention signal when said D.C. signal achieves a predetermined relationship to said reference signal; and a means for setting the gain of said variable gain receiver to a predetermined level during bursting such that said comparator means will not generate said contention signal unless interference beating with another carrier is causing the amplitude of the received signal to vary.

6. An apparatus as defined in claim 5 further including a controller means coupled to said transmitting means and said detecting means to cause said transmitting means to transmit said burst while simultaneously causing said gain setting means to set the gain of said variable gain receiver at a predetermined level to detect interference beating on said transmission medium.

7. An apparatus as defined in claim 6 wherein said controller means also is coupled to said comparator means and causes said gain setting means to set the gain of said receiver to a second predetermined level during said post burst listening period and monitors the output of said comparator means to determine if a signal is present on said transmission media.

8. An apparatus as defined in claim 2 or 3 further comprising means for controlling a delay imposed before a retry to transmit is initiated by generation of a random number which determines the delay.

9. An apparatus as defined in claim 2 or 3 wherein each transmitter and receiver modem in the data network both transmits data to the other modems and receives data from the other modems on a single frequency.

10. An apparatus as defined in claim 9 wherein each section of each modem receives data from the transmitter section in its own modem.

11. An apparatus as defined in claim 10 further comprising means for automatically adjusting the gain of the receiver section of each modem in the data network to a predetermined level during an unmodulated preamble signal preceding each transmitted data packet and holding that level constant during receipt of the entire data packet.

12. An apparatus for detecting contentions for the transmission medium in a broadband local data network comprising:

first means for generating a burst of energy containing no data;

second means for causing the frequency of said burst to be varied during the burst;

third means for receiving energy from said transmission medium and for generating a signal when the amplitude of said received energy is above a threshold level, said third means having variable gain;

fourth means for setting the gain of said third means during said burst such that said third means will generate no signal unless interference beating is causing the amplitude of the received energy to vary; and fifth means for determining whether interference beating has occurred and for causing a retry to transmit a predetermined period later as determined by a random number generated by the randomness of the interference beat pattern itself.

13. A local data network comprising:

a transmission medium;

a plurality of transceivers, each for sending data to and receiving data from the other transceivers over said transmission medium, each transceiver utilizing a modulated carrier wave of a single frequency for both transmitting and receiving, said frequency being the same for each transceiver; and means in each transceiver for reserving the transmission medium prior to sending data, said reserving means operating independent of any network control signal and guaranteeing exclusive access to said transmission medium independent of the order of connection of said transceivers to said transmission medium.

14. A locata data network as defined in claim 13 wherein said means in each transceiver for reserving said transmission medium comprises:

means for transmitting a non data bearing burst of carrier by each transceiver desiring to send data prior to sending said data; and means for listening for interference with any other signal on said transmission medium.

15. A local data network as defined in claim 14 further comprising means in each transceiver for detecting contentions for reserving said transmission medium by listening for any signal on said medium after said burst.

16. A local data network as defined in claim 14 or 15 further comprising means for controlling the time delay before another attempt to transmit is made by generating a random number and using said random number to determine the amount of delay before again attempting to transmit.

17. A local data network comprising:

a transmission medium;

a plurality of transceivers, each for sending data to and receiving data from the other transceivers over said transmission medium, each transceiver utilizing a modulated carrier wave of a single frequency for both transmitting and receiving, said frequency being the same for each transceiver;

means in each transceiver for avoiding contentions for said transmission medium by two or more transceivers attempting to simultaneously transmit, comprising:

means for transmitting a non data bearing burst of carrier by each transceiver desiring to send data prior to sending said data; and means for listening for interference with any other signal on said transmission medium;

means in each transceiver for detecting contentions for said transmission medium by listening for any signal on said medium after said burst;

means for controlling the time delay before another attempt to transmit is made by generating a random number and using said random number to determine the amount of delay before again attempting to transmit; and means for transmitting a non data bearing preamble preceding each data packet and means for adjusting the gain of each receiver for effective reception during said preamble and holding said gain for each transceiver constant during reception of the corresponding data packet.

18. A local data network comprising:

a transmission medium;

a plurality of transceivers, each for sending data to and receiving data from the other transceivers over said transmission medium, each transceiver utilizing a modulated carrier wave of a single frequency for both transmitting and receiving, said frequency being the same for each transceiver;

means in each transceiver for avoiding contentions for said transmission medium by two or more transceivers attempting to simultaneously transmit, comprising:

means for transmitting a non data bearing burst of carrier by each transceiver desiring to send data prior to sending said data; and means for listening for interference with any other signal on said transmission medium;

means in each transceiver for detecting contentions for said transmission medium by listening for any signal on said medium after said burst; and means for altering the frequency of said burst carrier during said burst and means for detecting contentions by detecting amplitude changes on said transmission medium caused by interference beating.

19. A data network comprising:
a transmission medium;
a plurality of transceivers each for sending data to and receiving data from the other transceivers in said data network over said transmission medium;
means for causing each transceiver to send a preamble of non data bearing energy prior to transmission of said data; and
means for setting the gain of each transceiver in said network during the preamble of a transmission from any transceiver and holding said gain constant during the corresponding data.

20. A data network for transferring packets of information between data devices, said network comprising:
a transmission medium;
a plurality of taps located on said transmission medium; and
a plurality of transceiver modems connected to said taps and having amplitude modulated radio frequency transmitter sections that produce access bursts of radio frequency carrier prior to transmitting packets of data on said bus line to prevent collisions of packets of data from more than one transmitter section.

21. A data network for transferring packets of information between data sections which listen to said access devices, said network comprising:
a transmission medium;
a plurality of taps located on said transmission medium; and
a plurality of transceiver modems connected to said taps and having amplitude modulated radio frequency transmitter sections that produce access bursts of radio frequency carrier prior to transmitting a packet of data on said bus line, wherein said transmitter sections automatically sweep the carrier frequency over a range of frequencies during said access burst.

22. The data network of claim 21 wherein said transceiver modem includes a receiver section having burst gain control circuitry that reduces the gain of the receiver section during the transmission of an access burst by the transmitter section of the same transceiver modem to a predetermined level.

23. The data network of claim 22 wherein said receiver section includes interference detection circuitry that detects the presence of amplitude pulses produces by the interference occurring when two carrier bursts each having changing frequency are present on said transmission medium simultaneously.

24. The data network of claim 23 wherein said transceiver modem includes a randomizing retry time delay means to delay retry attempts to send by a random delay, said delay means connected to said interference detection circuitry so that when interference between access bursts is detected, the time of occurrence of said amplitude pulses is used to randomize the time delay before said transceiver modem again produces an access burst.

25. The data network of claim 24 wherein said retry time delay means produces a random binary digit by toggling a beat counting flip-flop using the time of occurrence of said amplitude pulses to control said toggling during a predefined sampling time window which occurs during said access burst, so that said random binary digit controls the time delay before said transceiver modem will again start a sequence of steps to produce an access burst.

26. A data network for transferring packets of information between data devices, said network comprising:
a transmission medium;
a plurality of taps located on said transmission medium; and
a plurality of transceiver modems connected to said taps and having amplitude modulated radio frequency transmitter sections that produce access bursts of radio frequency carrier prior to transmitting a packet of data on said bus line,
each said transceiver modem also having a receiver section having automatic gain control circuitry which samples a constant amplitude preamble signal at the start of each data packet in order to establish an appropriate amplification level for good reception, and which holds the amplification level constant for the packet after the preamble signal has occurred.

27. The data network of claim 20 or 21 or 22 or 23 or 24 or 25 or 26 wherein all said transmitter and receiver sections of all said modems transmit and receive data on the same frequency carrier.

28. A method of transmitting packets of digital data using a plurality of transmitters each of which outputs an amplitude modulated radio frequency carrier having the same frequency on a single transmission medium coupled to a plurality of receivers which each have passbands encompassing the frequency of carrier said transmitters output, said method comprising the steps of:

(a) listening to said transmission medium in order to detect the the presence of conflicting carrier thereon for a predetermined period after the termination of the previous packet;

(b) transmitting an access burst of carrier on said transmission medium for a predetermined period after said previous listening period;

(c) listening to said bus line during the transmission of said access burst in order to detect the presence of conflicting carriers on said transmission medium during said access burst;

(d) listening to said transmission medium in order to detect the presence of carrier thereon for a predetermined period after said access burst; and (e) transmitting a data packet on said transmission medium if no conflicting carrier was detected during steps (a), (c), and (d) thereby avoiding collisions in the data packets transmitted by more than one transmitter.

29. The method of claim 28 further including the step of:
(f) delaying another attempt to transmit a data packet for a random time period after step (d) if (a) conflicting carrier was detected during steps (a), (c) and (d), said transmission access being retried by repeating the method steps by beginning again with step (a).

30. A method of transmitting packets of digital data using a plurality of transmitters each of which outputs an amplitude modulated radio frequency carrier having the same frequency on a single transmission medium coupled to a plurality of receivers which each have passbands encompassing the frequency of carrier said transmitters output, said method comprising the steps of:
(a) listening to said transmission medium in order to detect the presence of conflicting carrier thereon for a predetermined period after the termination of the previous packet;
(b) transmitting an access burst of carrier on said transmission medium for a predetermined period after said previous listening period, said transmitting step including changing the frequency of carrier during said access burst so that if two or more carriers are present on the bus line simultaneously, interference beating will be produced between the conflicting carriers;
(c) listening to said bus line during the transmission of said access burst in order to detect the presence of conflicting carriers on said transmission medium during said access burst;
(d) listening to said transmission medium in order to detect the presence of carrier thereon for a predetermined period after said access burst; and
(e) transmitting a data packet on said transmission medium if no conflicting carrier was detected during steps (a), (c), and (d).

31. The method of claim 30 further comprising the step:
(g) detecting the presence of amplitude pulses produced due to said interfeence beating during step (b), so that the time of occurrence of said amplitude pulses provides a randomizing function for controlling the minimum time delay before transmission of an access burst may be retried.

32. A method of receiving packets of digital data on an amplitude modulated radio frequency carrier bus line, said method comprising the steps of:
(a) listening to the transmission medium for a packet preamble in order to sample the preamble and establish a receive amplification level corresponding to the strength of the preamble signal; and
(b) listening to the transmission medium after said preamble and holding the receive amplification level established during said preamble constant.

33. A method of avoiding contentions in transmitting packets of digital data on a broadband local data network comprising:
transmitting a non data bearing burst of waveform;
varying the frequency of the waveform during the burst; and
listening for amplitude changes caused by interference beating between the transmitted burst and other signals.

34. The method of claim 33 further comprising listening during a post burst period for the presence of any other signal present on the transmission media.

35. A method as defined in claim 34 further comprising generating a random number from the randomness of the interference beat pattern itself and waiting a time determined by the random number so generated before attempting to transmit again.

36. A method as defined in claim 35 further comprising transmitting a data packet with an unmodulated preamble portion prior to transmitting each data packet and automatically adjusting the gain of each receiver in the system during said preamble according to the strength of its incoming signal and holding the gain levels so established constant during receipt of the data packet following the preamble.

37. An apparatus as defined in claim 3 further comprising means for imposing a delay before a retry to transmit is initiated by generation of a random number which determines the delay, said random number being generated by the randomness of the interference beat pattern.

38. An apparatus for detecting contentions for the transmission medium in a modulated carrier local data network having a plurality of transmitter and receiver modems, each modem comprising:
means for transmitting a non data bearing burst of energy on said transmission medium;
means for receiving signals on said transmission medium, said receiving means receiving said burst while said burst is being transmitted;
means for preventing data transmission in response to detection by said receiving means of energy from any other modem; and
means for transmitting data over the transmission medium if no energy from any other modem is detected.

39. An apparatus as defined in claim 38 wherein said non data bearing burst is a sinusoidal radio frequency carrier having a fixed amplitude.

40. An apparatus as defined in claim 38 further comprising means for controlling a delay imposed before a retry to transmit is initiated by generation of a random number which determines the delay.

41. An apparatus as defined in claim 38 wherein each transmitter and receiver modem in the data network both transmits data to the other modems and receives data from the other modems on a single frequency.

42. An apparatus as defined in claim 41 wherein each section of each modem receives data from the transmitter section in its own modem.

43. An apparatus for detecting contentions for the transmission medium in a modulated carrier local data network having a plurality of transmitter and receiver modems, each modem comprising:
means for transmitting a non data bearing burst of energy on said transmission medium;
means for receiving signals on said transmission medium, said receiving means receiving said burst while said burst is being transmitted;
means for preventing data transmission in response to detection by said receiving means of energy from any other modem; and
means for automatically adjusting the gain of the receiver section of each modem in the data network to a predetermined level during an unmodulated preamble signal preceding each transmitted data packet and holding that level constant during receipt of the entire data packet, wherein each section of each modem receives data from the transmitter section in its own modem and each transmitter and receiver modem in the data network both transmits data to the other modems and receives data from the other modems on a single frequency.

* * * * *